United States Patent
Space et al.

(10) Patent No.: US 10,029,797 B2
(45) Date of Patent: Jul. 24, 2018

(54) PERSONAL VENTILATION IN AN AIRCRAFT ENVIRONMENT

(71) Applicant: The Boeing Company, Chicago, IL (US)

(72) Inventors: David R. Space, Everett, WA (US); Charles A. Stout, Collierville, TN (US); James A. Fullerton, Bothell, WA (US); Timothy J. Arnaud, Everett, WA (US)

(73) Assignee: The Boeing Company, Chicago, IL (US)

( * ) Notice: Subject to any disclaimer, the term of this patent is extended or adjusted under 35 U.S.C. 154(b) by 537 days.

(21) Appl. No.: 14/191,186

(22) Filed: Feb. 26, 2014

(65) Prior Publication Data
US 2014/0179212 A1  Jun. 26, 2014

Related U.S. Application Data

(63) Continuation-in-part of application No. 12/241,389, filed on Sep. 30, 2008, now abandoned.

(51) Int. Cl.
| | |
|---|---|
| *B60N 2/879* | (2018.01) |
| *B64D 13/00* | (2006.01) |
| *B60N 2/56* | (2006.01) |
| *B64D 11/06* | (2006.01) |
| *B60N 2/885* | (2018.01) |

(52) U.S. Cl.
CPC ............. *B64D 13/00* (2013.01); *B60N 2/565* (2013.01); *B60N 2/5635* (2013.01);
(Continued)

(58) Field of Classification Search
None
See application file for complete search history.

(56) References Cited

U.S. PATENT DOCUMENTS

| | | | |
|---|---|---|---|
| 374,424 A | 12/1887 | Ober | |
| 1,674,535 A | 1/1928 | Verville | |
| 3,097,505 A | 7/1963 | Smith | |
| 3,112,002 A | 11/1963 | van der Lely | |
| 3,375,638 A | 4/1968 | Dungler et al. | |
| 3,537,447 A * | 11/1970 | Gauthier | A61G 13/108 128/847 |
| 3,724,172 A | 4/1973 | Wood | |
| 4,023,472 A | 5/1977 | Grunder et al. | |
| 4,035,018 A | 7/1977 | Erbele et al. | |

(Continued)

FOREIGN PATENT DOCUMENTS

| | | | | |
|---|---|---|---|---|
| DE | 3333878 A1 * | 3/1985 | ........... | B60H 1/3428 |
| EP | 0217752 A2 | 4/1987 | | |

(Continued)

OTHER PUBLICATIONS

"Cleaning aircraft-cabin air: Breathing more easily," The Economist, Sep. 17, 2009, 3 pages. Accessed Jul. 1, 2013, http://www.economist.com/node/14446718.

(Continued)

*Primary Examiner* — Alissa Tompkins
*Assistant Examiner* — Frances F Hamilton
(74) *Attorney, Agent, or Firm* — Yee & Associates, P.C.

(57) ABSTRACT

A method for providing purified air to an occupant of a seat in a mask lacking corporeal features that is generated by an apparatus. The apparatus includes a contaminant conditioning system that delivers purified air to a first and a second laminar flow generator. Each laminar flow generator produces a respective laminar flow that combines to form and fill a breathing space with purified air that envelopes an inhalation sphere of the occupant and inhibits air other than the purified air from entering the breathing space.

15 Claims, 14 Drawing Sheets

(52) U.S. Cl.
CPC ......... *B60N 2/5657* (2013.01); *B60N 2/5671* (2013.01); *B60N 2/879* (2018.02); *B60N 2/885* (2018.02); *B64D 11/06* (2013.01); *B64D 11/0626* (2014.12); *Y02T 50/56* (2013.01)

(56) References Cited

U.S. PATENT DOCUMENTS

| | | | | |
|---|---|---|---|---|
| 4,114,521 | A | * | 9/1978 | Busch .................. F24F 7/06 118/326 |
| 4,376,408 | A | | 3/1983 | Iijima et al. |
| 4,412,849 | A | * | 11/1983 | Shahani ............... F24F 3/1607 454/189 |
| 4,440,164 | A | * | 4/1984 | Werjefelt .............. A62B 11/00 128/202.13 |
| 4,461,155 | A | | 7/1984 | Werjefelt |
| 4,559,939 | A | * | 12/1985 | Levine ................ A62B 7/00 128/201.15 |
| 4,581,988 | A | * | 4/1986 | Mattei ................ B60H 1/00378 454/70 |
| 4,612,975 | A | | 9/1986 | Ikari |
| 4,742,760 | A | | 5/1988 | Horstman et al. |
| 4,751,919 | A | * | 6/1988 | Thomsen .............. A61H 23/04 601/156 |
| 4,766,893 | A | * | 8/1988 | Drews ................ A62B 17/04 128/201.29 |
| 4,819,548 | A | | 4/1989 | Horstman |
| 4,832,287 | A | * | 5/1989 | Werjefelt .............. B60R 1/00 244/118.5 |
| 4,881,456 | A | * | 11/1989 | Yasuda .............. B60H 1/00742 165/203 |
| 5,007,421 | A | * | 4/1991 | Stewart ................ A62B 7/00 128/204.18 |
| 5,102,189 | A | | 4/1992 | Saito et al. |
| 5,160,517 | A | | 11/1992 | Hicks et al. |
| 5,299,763 | A | | 4/1994 | Bescoby et al. |
| 5,450,894 | A | | 9/1995 | Inoue et al. |
| 5,832,919 | A | | 11/1998 | Kano et al. |
| 5,997,091 | A | * | 12/1999 | Rech .................. B60N 2/4838 297/217.3 |
| 6,012,297 | A | * | 1/2000 | Ichishi .............. B60H 1/00871 165/203 |
| 6,019,676 | A | | 2/2000 | Kim |
| 6,080,059 | A | | 6/2000 | Kim |
| 6,179,706 | B1 | | 1/2001 | Yoshinori et al. |
| 6,189,966 | B1 | | 2/2001 | Faust et al. |
| 6,196,627 | B1 | | 3/2001 | Faust et al. |
| 6,241,598 | B1 | * | 6/2001 | Kleissler, Jr. ......... B08B 15/026 454/187 |
| 6,277,023 | B1 | | 8/2001 | Schwarz |
| 6,293,860 | B1 | | 9/2001 | Kim |
| 6,340,024 | B1 | * | 1/2002 | Brookman ............. A62B 17/04 128/201.15 |
| 6,372,101 | B1 | | 4/2002 | Barrese et al. |
| 6,491,254 | B1 | | 12/2002 | Walkinshaw et al. |
| 6,604,785 | B2 | | 8/2003 | Bargheer et al. |
| 6,626,971 | B1 | * | 9/2003 | Forbert .................. F24F 1/027 454/187 |
| 6,644,735 | B2 | * | 11/2003 | Bargheer ........... B60H 1/00285 297/180.13 |
| 6,659,689 | B1 | * | 12/2003 | Courtney ................ B63C 9/08 2/2.17 |
| 6,685,553 | B2 | | 2/2004 | Aoki |
| 6,744,898 | B1 | * | 6/2004 | Hirano .................. H04R 5/023 381/301 |
| 6,746,076 | B2 | | 6/2004 | Bogisch et al. |
| 6,761,399 | B2 | * | 7/2004 | Bargheer ................ B60N 2/48 297/180.12 |
| 6,910,961 | B2 | | 6/2005 | Niu |
| 6,928,829 | B2 | | 8/2005 | Kamiya et al. |
| 6,976,734 | B2 | | 12/2005 | Stoewe |
| 7,037,188 | B2 | | 5/2006 | Schmid et al. |
| 7,080,443 | B2 | * | 7/2006 | Dubuc .................. B60P 3/14 269/17 |
| 7,195,316 | B2 | | 3/2007 | Shimasaki et al. |
| 7,201,441 | B2 | | 4/2007 | Stoewe et al. |
| 7,213,876 | B2 | | 5/2007 | Stoewe |
| 7,275,984 | B2 | | 10/2007 | Aoki |
| 7,300,499 | B1 | | 11/2007 | Fleisher |
| 7,399,037 | B2 | | 7/2008 | Schumacher et al. |
| 7,419,214 | B2 | | 9/2008 | Plant |
| 7,506,924 | B2 | | 3/2009 | Bargheer et al. |
| 7,531,017 | B2 | * | 5/2009 | Ryan .................. B01L 1/50 454/187 |
| 7,581,785 | B2 | | 9/2009 | Heckmann et al. |
| 7,621,594 | B2 | | 11/2009 | Hartmann et al. |
| 7,708,626 | B2 | | 5/2010 | Bargheer et al. |
| 7,789,346 | B2 | | 9/2010 | Horstman et al. |
| 7,871,038 | B2 | | 1/2011 | Space et al. |
| 7,873,451 | B2 | | 1/2011 | Hartmann et al. |
| 8,003,058 | B2 | | 8/2011 | Bergeron et al. |
| 8,206,475 | B2 | * | 6/2012 | Walkinshaw ........ B60H 3/0007 55/385.2 |
| 2001/0002363 | A1 | * | 5/2001 | Laborde ................ F24F 9/00 454/190 |
| 2002/0041116 | A1 | * | 4/2002 | Bogisch ............... B60J 7/223 297/180.1 |
| 2002/0076059 | A1 | * | 6/2002 | Joynes .............. G10K 11/1788 381/71.6 |
| 2004/0168459 | A1 | * | 9/2004 | Blackstone ........ A41D 13/0025 62/259.2 |
| 2005/0016199 | A1 | * | 1/2005 | Blackstone ........ A41D 13/0025 62/420 |
| 2005/0178138 | A1 | * | 8/2005 | Blackstone ........ A41D 13/0025 62/259.3 |
| 2005/0282486 | A1 | * | 12/2005 | Takeda .................. B60H 1/247 454/158 |
| 2006/0032265 | A1 | * | 2/2006 | Shaw .................... B60N 2/5621 62/420 |
| 2006/0079168 | A1 | * | 4/2006 | Goldsmith ............. A61L 9/015 454/156 |
| 2006/0267383 | A1 | | 11/2006 | Bargheer et al. |
| 2007/0068520 | A1 | * | 3/2007 | Laib ..................... A62B 17/04 128/201.19 |
| 2007/0266855 | A1 | | 11/2007 | Fleisher |
| 2008/0066484 | A1 | * | 3/2008 | Blackstone ........ A41D 13/0053 62/421 |
| 2008/0099606 | A1 | | 5/2008 | Horstman et al. |
| 2008/0170971 | A1 | | 7/2008 | Bergeron et al. |
| 2008/0175426 | A1 | * | 7/2008 | Jacobs ................. B60H 1/247 381/374 |
| 2008/0191520 | A1 | | 8/2008 | Hartmann et al. |
| 2008/0308106 | A1 | | 12/2008 | Augustine et al. |
| 2008/0315634 | A1 | | 12/2008 | Hartmann et al. |
| 2009/0017742 | A1 | * | 1/2009 | Diaks .................. B64D 13/06 454/76 |
| 2009/0044800 | A1 | * | 2/2009 | Jorn .................... A62B 7/14 128/203.12 |
| 2009/0134675 | A1 | | 5/2009 | Pfahler |
| 2009/0139519 | A1 | * | 6/2009 | Deutscher ............. A62B 7/14 128/202.26 |
| 2010/0043794 | A1 | | 2/2010 | Saito et al. |
| 2010/0081369 | A1 | | 4/2010 | Space et al. |
| 2012/0199003 | A1 | * | 8/2012 | Melikov ................ A61G 10/02 95/273 |
| 2013/0040546 | A1 | | 2/2013 | Noske et al. |
| 2014/0363333 | A1 | * | 12/2014 | Carr ..................... A61L 9/16 422/4 |

FOREIGN PATENT DOCUMENTS

| | | | | |
|---|---|---|---|---|
| FR | 2592617 A1 | | 7/1987 | |
| JP | 60174314 A | * | 9/1985 | ......... B60H 1/00742 |
| JP | 11059597 A | * | 3/1999 | ............ B64D 13/00 |

OTHER PUBLICATIONS

Hunt et al, "The Airplane Cabin Environment—Issues Pertaining to Flight Attendant Comfort," Presented at the International In-flight

(56) References Cited

OTHER PUBLICATIONS

Service Management Organization Conference, Montreal, Canada, Nov. 1994, 12 pages.
Office Action, dated Dec. 7, 2011, regarding U.S. Appl. No. 12/241,389, 19 pages.
Final Office Action, dated Jul. 19, 2012, regarding U.S. Appl. No. 12/241,389, 20 pages.
Office Action, dated Apr. 26, 2013, regarding U.S. Appl. No. 12/241,389, 26 pages.
Office Action, dated Apr. 9, 2014, regarding U.S. Appl. No. 12/241,389, 23 pages.

* cited by examiner

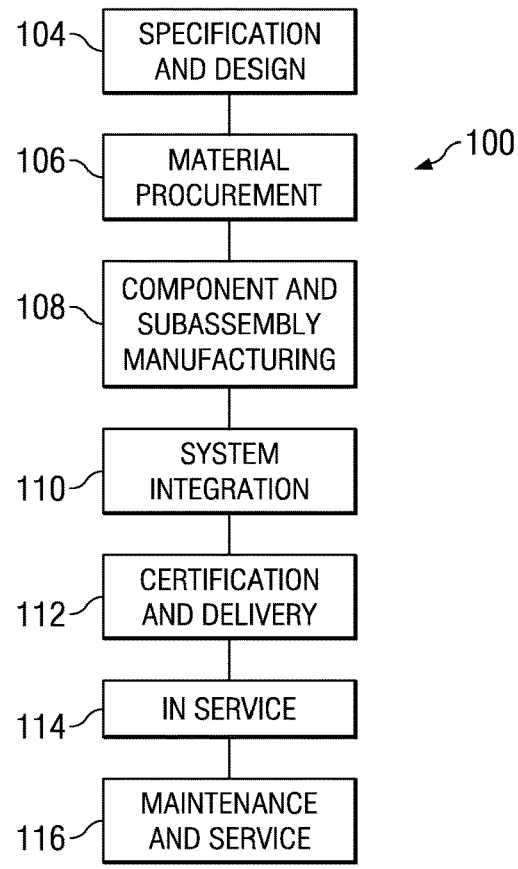
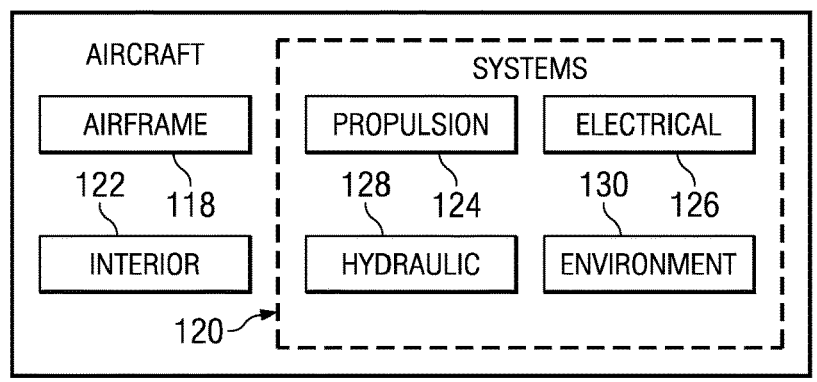

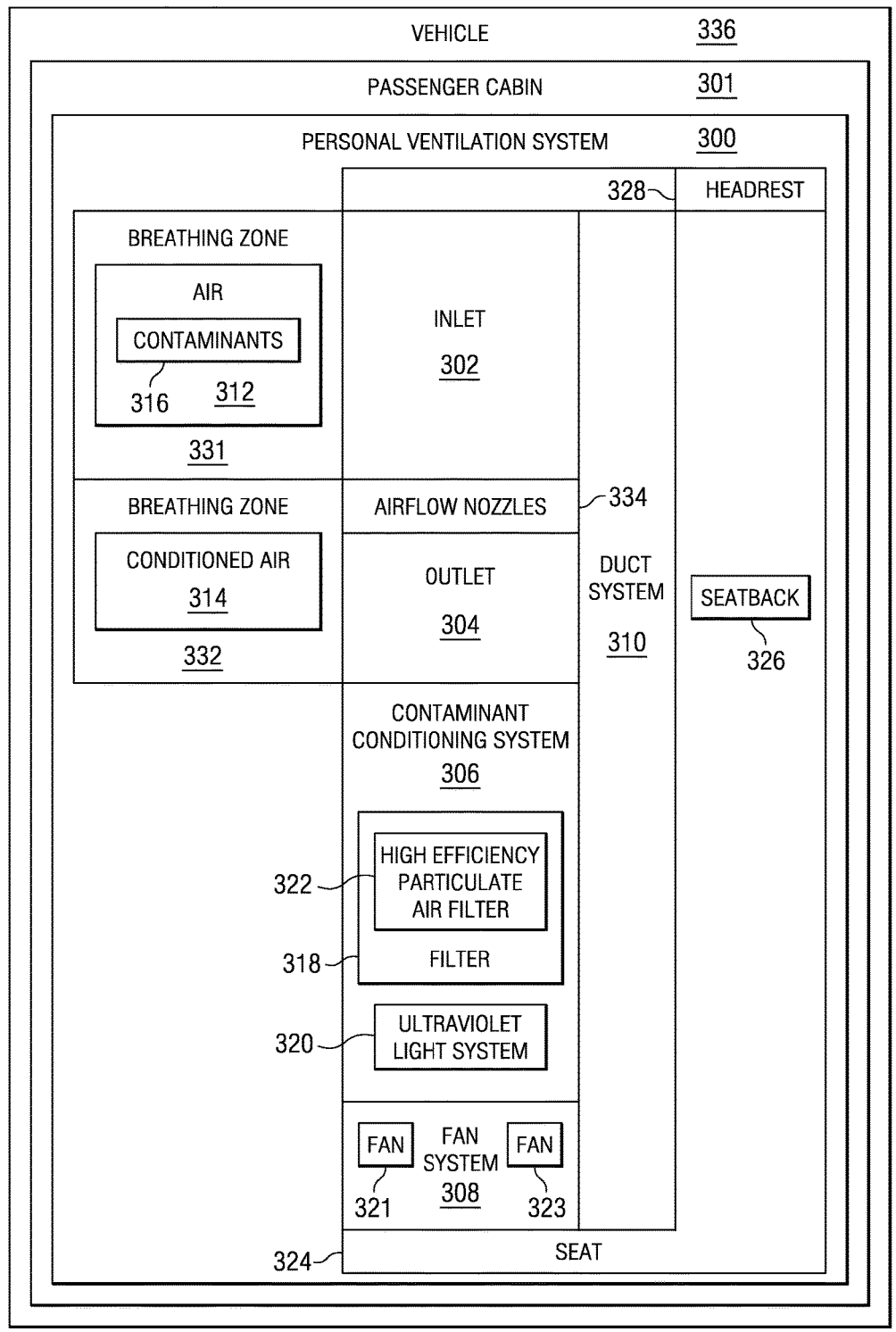

| GENDER | PERCENTILE | DISTANCE FROM THE BACK OF THE HEAD | VERTICAL DISTANCE OF THE TOP OF THE BREATHING ZONE FROM THE SEAT PAN | DIAMETER OF THE BREATHING ZONE |
|---|---|---|---|---|
| MALE | 99 | 8.49 in | 35.27 in | 4.71 in |
| FEMALE | 99 | 7.97 in | 32.90 in | 4.19 in |
| MALE | 50 | 7.86 in | 31.53 in | 3.89 in |
| FEMALE | 50 | 7.40 in | 29.63 in | 3.62 in |
| MALE | 1 | 7.19 in | 28.08 in | 3.27 in |
| FEMALE | 1 | 6.78 in | 26.57 in | 3.07 in |

PERSONAL VENTILATION IN AN AIRCRAFT ENVIRONMENT

CONTINUATION-IN-PART STATEMENT

This application is a continuation-in-part (CIP) of and claims priority to the following patent application: entitled "PERSONAL VENTILATION IN AN AIRCRAFT ENVIRONMENT" Ser. No. 12/241,389, filed Sep. 30, 2008, and is incorporated herein in its entirety by reference.

BACKGROUND INFORMATION

1. Field

The present disclosure relates generally to aircraft and in particular to a method and apparatus for managing air quality in an aircraft. Still more particularly, the present disclosure relates to a method and apparatus for providing personal ventilation in an aircraft.

2. Background

Cabin air systems, in currently available aircraft, are designed to provide a safe and comfortable cabin environment at cruising altitudes. These cruising altitudes may reach upwards of 40,000 feet. At these altitudes, the aircraft cabin is pressurized to enable the passengers and crew to breathe normally. Air enters a passenger area from overhead distribution outlets that run the length of the passenger cabin.

These outlets may be designed to generate circular airflow patterns within the cabin. Air may be exhausted through air returns located in sidewalls near the floor of the cabin. These grills may be located along the length of the cabin and on both sides of the cabin. Air may be supplied and exhausted from the passenger area on a continuous basis.

The air supplied to the cabin contains a mixture of re-circulated air from within the passenger cabin and air from outside of the aircraft. To increase the efficiency of modern jet aircraft and comfort of the aircraft cabin, it may be desirable to increase the ratio of recycled/re-circulated air to outside air. In the early days of jet travel, the aircraft cabin was around 100 percent outside air.

Today, the mix of outside air and re-circulated air may be around 50 percent outside air and around 50 percent re-circulated air. As a result of this change, there was a small increase in humidity levels. However, there may be a concern that an increased level of contaminants may be present in modern jet aircraft cabins due to the increased levels of re-circulated cabin air. Additionally, this increased level of contaminants may decrease passenger enjoyment.

One solution may involve increasing the total airflow to dilute contaminants utilizing high-efficiency particulate air (HEPA) filters for the entire passenger cabin. Other solutions may involve airflow balancing in the cabin to minimize airflow in the fore and aft directions. Further, ultraviolet lights may be included within the aircraft ventilation ducts. The ultraviolet lights may be used to inactivate airborne bacteria and/or viruses.

These systems may remove, dilute, and/or destroy contaminants from the cabin air as it circulates within the aircraft. In these examples, contaminants may include any undesirable particulate. For example, without limitation, a contaminant may be bacteria, viruses, pollen, dust, or other undesirable items. Although these systems may clean air within the passenger cabin, the different advantageous embodiments recognize a limitation with these types of solutions.

Accordingly, there is a need for a method and apparatus for ventilating air in a passenger cabin of an aircraft which overcomes the limitations described above.

SUMMARY

In one advantageous embodiment, an apparatus may comprise an inlet capable of receiving air around a seat, a contaminant conditioning system, an outlet, and a fan system. The contaminant conditioning system may be capable of removing contaminants from the air to form conditioned air. The outlet may be capable of expelling the conditioned air around the seat. The fan system may be capable of drawing the air from a breathing zone through the inlet, moving the air drawn from the inlet to the contaminant conditioning system to form the conditioned air, and moving the conditioned air out of the outlet.

In another advantageous embodiment, an aircraft may comprise a passenger cabin for the aircraft, a plurality of seats in the passenger cabin, and a plurality of personal ventilation systems. The plurality of personal ventilation systems may be integrated with the plurality of seats in which each personal ventilation system comprises a duct system; an inlet connected to the duct system capable of receiving air; a contaminant conditioning system connected to the duct system capable of removing contaminants from the air to form conditioned air; an outlet connected to the duct system; and a fan system capable of drawing the air from a breathing zone through the inlet, moving the air drawn from the inlet through the duct system to the contaminant conditioning system to form the conditioned air, and moving the conditioned air from the contaminant conditioning system though the duct system to the outlet.

In yet another advantageous embodiment, a personal ventilation system for conditioning air in a passenger cabin may comprise an inlet, a contaminant conditioning system, an outlet, a fan system, a duct system, a vehicle, and a passenger cabin. The inlet may be located in at least one of a head rest and a seatback of a seat, and may be capable of receiving the air around the seat. The contaminant conditioning system may be located in the seat and may have at least one of a high efficiency particulate air filter and an ultraviolet light system capable of removing contaminants from the air to form conditioned air. The outlet may have a number of nozzles located in at least one of the head rest and seatback of the seat and may be capable of expelling the conditioned air around the seat into one of a first breathing zone and a second breathing zone. The fan system may be capable of drawing the air from the first breathing zone through the inlet, moving the air drawn from the inlet to the contaminant conditioning system to form the conditioned air, and moving the conditioned air out of the outlet. The duct system may connect the inlet, the fan, the contaminant conditioning system, and the outlet to each other. The passenger cabin may be located in the vehicle, wherein the inlet, the contaminant conditioning system, the outlet, and the fan system may be located in the passenger cabin. The vehicle may be selected from one of an aircraft, a submarine, a bus, a personnel carrier, a tank, a train, an automobile, a bus, a spacecraft, and a surface ship.

In still yet another advantageous embodiment, a method may be present for processing air. The air may be moved around a seat in a passenger cabin into an inlet to a contaminant conditioning system. Contaminants may be removed from the air to form conditioned air using the contaminant conditioning system. The conditioned air may be expelled through an outlet around the seat.

In a further advantageous embodiment, a method may be present for ventilating air in an aircraft passenger cabin. Air from a first breathing zone may be moved around a seat in a passenger cabin into an inlet to a contaminant conditioning system. Contaminants may be removed from the air to form conditioned air using the contaminant conditioning system. The conditioned air may be expelled through an outlet around the seat into one of the first breathing zone and a second breathing zone around the seat.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 1 is a flow diagram of an aircraft production and service methodology in accordance with an advantageous embodiment;

FIG. 2 is a block diagram of an aircraft in accordance with an advantageous embodiment;

FIG. 3 is a diagram of a personal ventilation system in accordance with an advantageous embodiment;

FIG. 12 depicts anthropometry data, a side view, and a front view for defining dimensions for an inhalation sphere for an occupant seated in a seat in accordance with an illustrative embodiment.

FIG. 13 depicts an overhead view and a side view of a breathing space that may be filled and isolated by a first laminar flow from a first laminar airflow generator combining with a second laminar flow from a second laminar airflow generator, in accordance with an illustrative embodiment.

FIG. 14 depicts profile views of three purified air delivery methods, two current methods and one using a laminar flow generator, in accordance with an illustrative embodiment.

DETAILED DESCRIPTION

Figure 4:
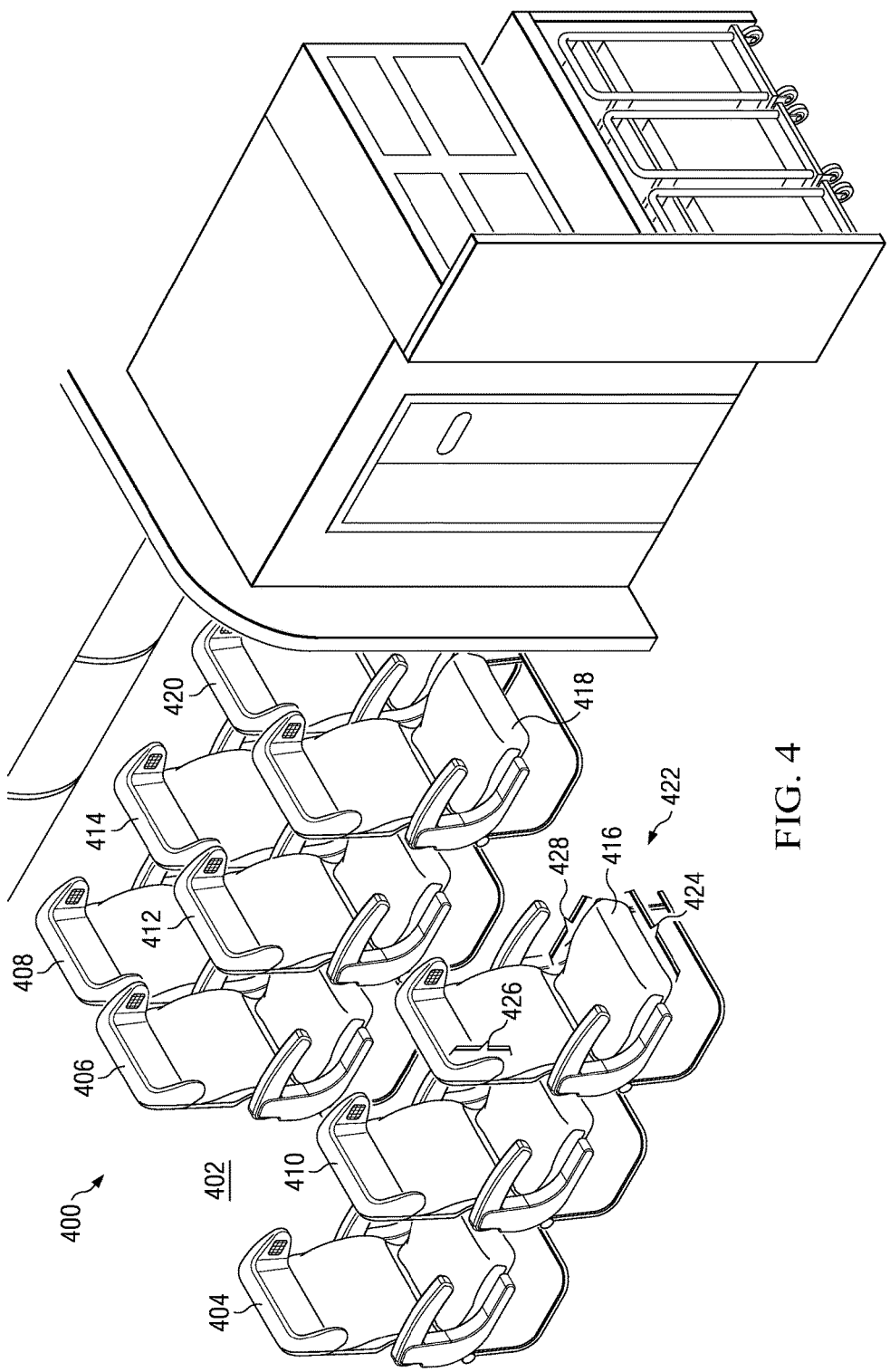
FIG. 4 is a diagram illustrating a portion of a passenger cabin in accordance with an advantageous embodiment.

Referring more particularly to the drawings, embodiments of the disclosure may be described in the context of aircraft manufacturing and service method 100 as shown in FIG. 1 and aircraft 102 as shown in FIG. 2. During pre-production, aircraft manufacturing and service method 100 may include specification and design 104 of aircraft 102 and material procurement 106.

During production, component and subassembly manufacturing 108 and system integration 110 of aircraft 102 takes place. Thereafter, aircraft 102 may go through certification and delivery 112 in order to be placed in service 114. While in service by a customer, aircraft 102 is scheduled for routine maintenance and service 116 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 102 produced by aircraft manufacturing and service method 100 may include airframe 118 with a plurality of systems 120 and interior 122. Examples of systems 120 include one or more of propulsion system 124, electrical system 126, hydraulic system 128, and environmental system 130. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 108 may be fabricated or manufactured in a manner similar to components or subassemblies produced while aircraft 102 is in service.

Also, one or more apparatus embodiments, method embodiments, or a combination thereof may be utilized during component and subassembly manufacturing 108 and system integration 110, for example, without limitation, by substantially expediting assembly of or reducing the cost of aircraft 102. Similarly, one or more of apparatus embodiments, method embodiments, or a combination thereof may be utilized while aircraft 102 is in service, for example, without limitation, to maintenance and service 116.

The different advantageous embodiments recognize and take into account that with currently available passenger cabin ventilation systems for aircraft, the circulation patterns may be inadequate for limiting air exhaled from one passenger from flowing into the breathing zone of another passenger.

The different advantageous embodiments recognize and take into account that currently available passenger cabin ventilation systems may generate air circulation patterns in which air is introduced into the cabin and removed from the cabin using airflows that may travel through breathing zones for multiple passengers. In these examples, a breathing zone may be any area within a passenger cabin in which air is present that may be inhaled by a particular passenger.

The different advantageous embodiments recognize that the current high-efficiency particulate air filters may only work once the air has left the cabin and has then gone through the recirculation system. This type of recirculation, however, does not take into account that passengers may inhale air that has been exhaled by passengers nearby. The different advantageous embodiments also recognize that increased airflow may only dilute contaminants. The higher airflow may require increased fan speeds, with a higher cost of fuel for this type of ventilation.

Thus, the different advantageous embodiments provide a method and apparatus to provide personal ventilation within a passenger cabin of an aircraft. In the different advantageous embodiments, air exhaled by a passenger may be conditioned in a manner that reduces and/or prevents contaminants contained in the exhaled air from one passenger from entering a breathing zone of another passenger.

The different advantageous embodiments provide a method and apparatus for conditioning air. In one advantageous embodiment, an apparatus may include an inlet, an outlet, a contaminant conditioning system, and a fan system. The inlet may be capable of receiving air around a seat. The contaminant conditioning system may be capable of removing contaminants from the air to form conditioned air. The outlet may be capable of expelling the conditioned air around the seat. The fan system may be capable of drawing air from a breathing zone through the inlet, moving the air drawn from the inlet to the contaminant conditioning system to form the conditioned air, and moving the conditioned air out of the outlet.

These components may be connected to each other through a duct system. Further, the air may be expelled into the original passenger's breathing zone or into a different passenger's breathing zone.

With reference now to FIG. 3, a diagram of a personal ventilation system is depicted in accordance with an advantageous embodiment. Personal ventilation system 300 is an example of a personal ventilation system that may be implemented in environmental system 130 of aircraft 102 in FIG. 2.

In this example, personal ventilation system 300 may be located within passenger cabin 301. In this example, personal ventilation system 300 may include inlet 302, outlet 304, contaminant conditioning system 306, fan system 308, and duct system 310. Inlet 302 may receive air, while outlet 304 may expel air processed by personal ventilation system 300.

Contaminant conditioning system 306 includes filter 318, ultraviolet light system 320, and any other suitable contaminant removal system. For example, without limitation, in other advantageous embodiments, an electrostatic device may be used to remove contaminants. In these examples, filter 318 may take the form of high efficiency particulate air filter 322.

Contaminant conditioning system 306 may be capable of removing contaminants from air 312 to form conditioned air 314. In these examples, without limitation, contaminants may be removed by physically removing the contaminants and/or rendering the contaminants incapable of causing undesired effects.

For example, without limitation, bacteria and/or viruses may be destroyed and/or rendered inert. In another example, bacteria and/or pollen may be removed from air 312. In these examples, contaminants 316 in air 312 may be removed by filter 318 and/or ultraviolet light system 320. This physical removal and/or inactivating of contaminants in air 312 may also be referred to as conditioning air.

Duct system 310 interconnects inlet 302, outlet 304, contaminant conditioning system 306, and fan system 308. Duct system 310 may be an enclosure that may be capable of allowing air 312 to flow within personal ventilation system 300. For example, without limitation, duct system 310 may comprise channels, tubes, interior spaces, or some other suitable system. Fan system 308 may contain a number of fans. In this example, fan system 308 may have fan 321 and fan 323. Of course, any suitable number of fans may be employed in fan system 308. Fan system 308 may be capable of moving air through the different components. Fan system 308 may be capable of moving air through outlet 304 into duct system 310.

In these examples, at least one of inlet 302, outlet 304, contaminant conditioning system 306, fan system 308, and duct system 310 may be integrated in seat 324. Inlet 302 and outlet 304 may be located in seatback 326. In other advantageous embodiments, one or more of inlet 302 and/or outlet 304 may be located in headrest 328. Of course, without limitation, the location of these components may vary depending on the particular implementation.

As used herein, the phrase "at least one of", when used with a list of items, means that different combinations of one or more of the items may be used, and only one of each item in the list may be needed. For example, "at least one of item A, item B, and item C" may include, for example, without limitation, item A, or item A and item B. This example also may include item A, item B, and item C, or item B and item C.

In operation, air 312 may be drawn in from breathing zone 331 through inlet 302 by fan system 308. Air 312 may be circulated and/or moved through duct system 310 to contaminant conditioning system 306. Contaminant conditioning system 306 may generate conditioned air 314. Conditioned air 314 may then be moved through duct system 310 out into breathing zone 332 through airflow nozzles 334 in outlet 304.

In different advantageous embodiments, breathing zone 331 and breathing zone 332 may be the same breathing zone for a particular passenger. In other advantageous embodiments, breathing zone 331 may be a breathing zone for one passenger, while breathing zone 332 may be a breathing zone for another passenger. A breathing zone is defined as an area in which air may be inhaled and exhaled by an individual passenger while occupying their given seat.

In this manner, contaminants may be removed, while the air may still be within a breathing zone of a passenger. This type of conditioning of air may avoid contaminants being inhaled by passengers in adjacent breathing zones, as compared to currently available passenger cabin ventilation systems.

In these examples, passenger cabin 301 may be located within vehicle 336. Vehicle 336 may take various forms. For example, without limitation, vehicle 336 may be, without limitation, an aircraft, a submarine, a bus, a personnel carrier, a tank, a train, an automobile, a spacecraft, a surface ship, and/or some other suitable vehicle that permits a plurality of occupants.

The illustration of personal ventilation system 300 in FIG. 3 is not meant to imply physical and/or architectural limitations to the manner in which different advantageous embodiments may be implemented. Other components in addition to or in place of the ones illustrated in FIG. 3 may be used. For example, without limitation, fan system 308 may be located under the passenger floor of passenger cabin 301, rather than being integrated into seat 324. In another example, inlet 302 may be located in a seat cushion area, rather than headrest 328 and/or seatback 326.

For example, in one advantageous embodiment, inlet 302 and outlet 304 may be located around headrest 328 of seatback 326. In this type of implementation, inlet 302 and outlet 304 may be located on the same side of headrest 328. In particular, the side may be that of a passenger's head. Inlet 302 may draw air 312 through contaminant conditioning system 306 using fan system 308. Conditioned air 314 may be sent back through outlet 304 and headrest 328. In this type of advantageous embodiment, breathing zone 331 and breathing zone 332 may be the same breathing zone.

With reference now to FIG. 4, a diagram illustrating a portion of a passenger cabin is depicted in accordance with an advantageous embodiment. In this example, passenger cabin 400 is an example of one implementation of passenger cabin 301 in FIG. 3.

As can be seen in this example, passenger cabin 400 may have passenger area 402, in which seats 404, 406, 408, 410, 412, 414, 416, 418, and 420 may be located. These seats may be examples of seats in which a personal ventilation system such as, for example, without limitation, personal ventilation system 300 in FIG. 3 may be located.

Within passenger cabin 400, a breathing zone may be present with respect to each of seats 404, 406, 408, 410, 412, 414, 416, 418, and 420. For example, without limitation, breathing zone 422 may be around width 424, height 426, and depth 428 of seat 416. Height 426 may be from the top of a passenger's shoulders to the top of their head in a seated position within seat 416.

Figure 5:
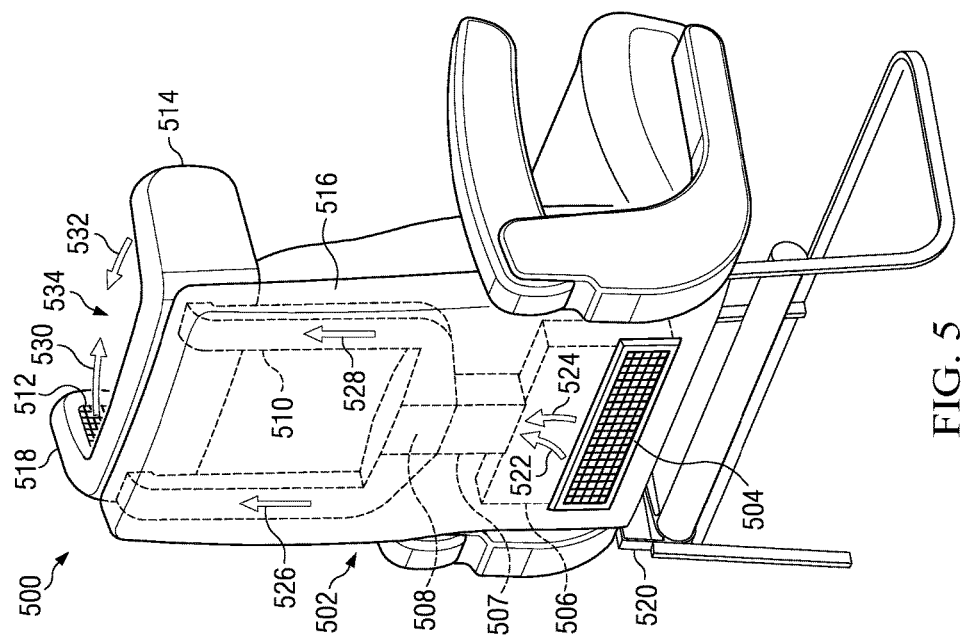
FIG. 5 is a diagram of a seat with a personal ventilation system in accordance with an advantageous embodiment.

With reference now to FIG. 5, a diagram of a seat with a personal ventilation system is depicted in accordance with an advantageous embodiment. In this example, seat 500 is an example of one implementation of a seat within passenger cabin 400 in FIG. 4, and is one example of the manner in which seat 324 in FIG. 3 may be implemented. In this example, seat 500 may contain personal ventilation system 502. Personal ventilation system 502 may include inlet 504, ultraviolet light unit 506, fan 507, filter 508, duct system 510, outlet 512, and outlet 514. Inlet 504, ultraviolet light unit 506, fan 507, filter 508, and duct system 510 may be integrated within seatback 516 of seat 500. Outlet 512 and outlet 514 may be located in headrest 518.

In this illustrative example, air may be drawn into inlet 504 from breathing zone 520 by fan 507 and travel through ultraviolet light unit 506 in the direction of arrows 522 and 524. As air travels through ultraviolet light unit 506, various contaminants may be removed. In these examples, a contaminant may be considered to be removed when the contaminant is inactivated or no longer capable of being considered a contaminant. For example, without limitation, ultraviolet light unit 506 may inactivate bacteria and/or viruses to render those contaminants incapable of causing undesired effects. This inactivated state may be considered a removal of a contaminant in these illustrative embodiments.

The air may then move into filter 508, which may physically remove contaminants from the air to form conditioned air. Thereafter, the air may travel through duct system 510 in the direction of arrows 526 and 528 to be expelled through outlets 512 and 514 around seat 500, as illustrated by arrows 530 and 532, into breathing zone 534.

Figure 6:
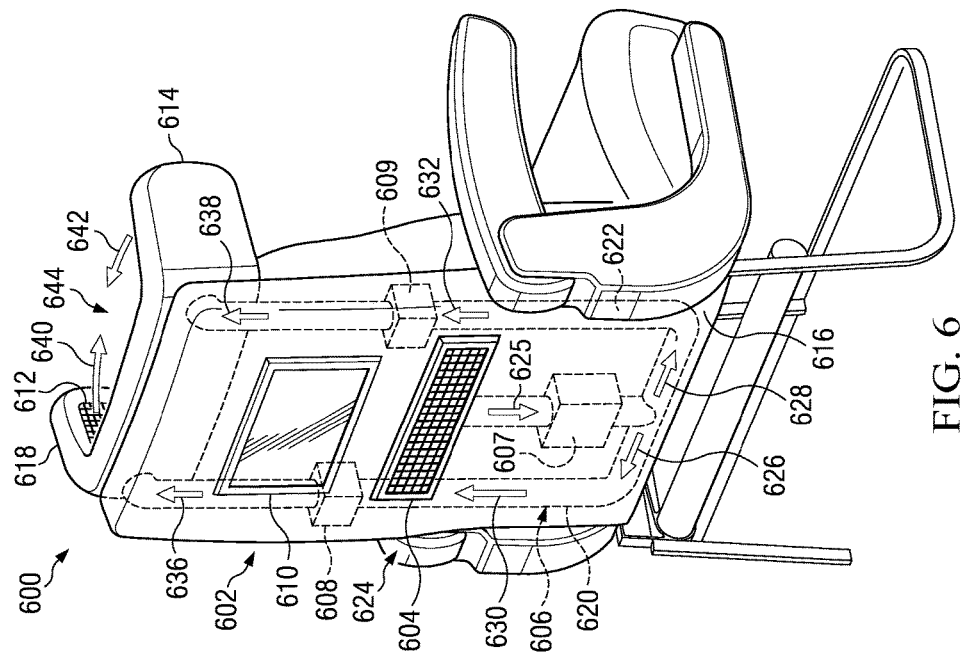
FIG. 6 is a diagram of a seat with a personal ventilation system in accordance with an advantageous embodiment.

With reference now to FIG. 6, a diagram of a seat with a personal ventilation system is depicted in accordance with an advantageous embodiment. In this example, seat 600 is another example of an implementation of a seat within passenger cabin 400 in FIG. 4 and is an example of one manner in which seat 324 in FIG. 3 may be implemented. Personal ventilation system 602 may include inlet 604, ultraviolet light unit 606, fan 607, filter 608, filter 609, duct system 610, outlet 612, and outlet 614. Inlet 604, ultraviolet light unit 606, fan 607, filter 608, filter 609, and duct system 610 may be incorporated within seatback 616. Outlet 612 and outlet 614 may be located in headrest 618.

In this example, ultraviolet light unit 606 may comprise ultraviolet light chamber 620 and ultraviolet light chamber 622. Ultraviolet light may be emitted within ultraviolet light chamber 620 and ultraviolet light chamber 622 to inactivate contaminants in air passing through ultraviolet light chamber 620 and ultraviolet light chamber 622. In this example, air from breathing zone 624 may be drawn into inlet 604 by fan 607 in the direction of arrow 625 and move along the direction of arrows 626, 628, 630, and 632 through ultraviolet light chamber 620 and ultraviolet light chamber 622.

Thereafter, air may travel through filter 608 and filter 609 to further remove contaminants from the air to form conditioned air that travels through duct system 610 in the direction of arrows 636 and 638. The conditioned air may then be expelled through outlet 612 and 614 in the direction of arrows 640 and 642 into breathing zone 644 as conditioned air.

Figure 7:
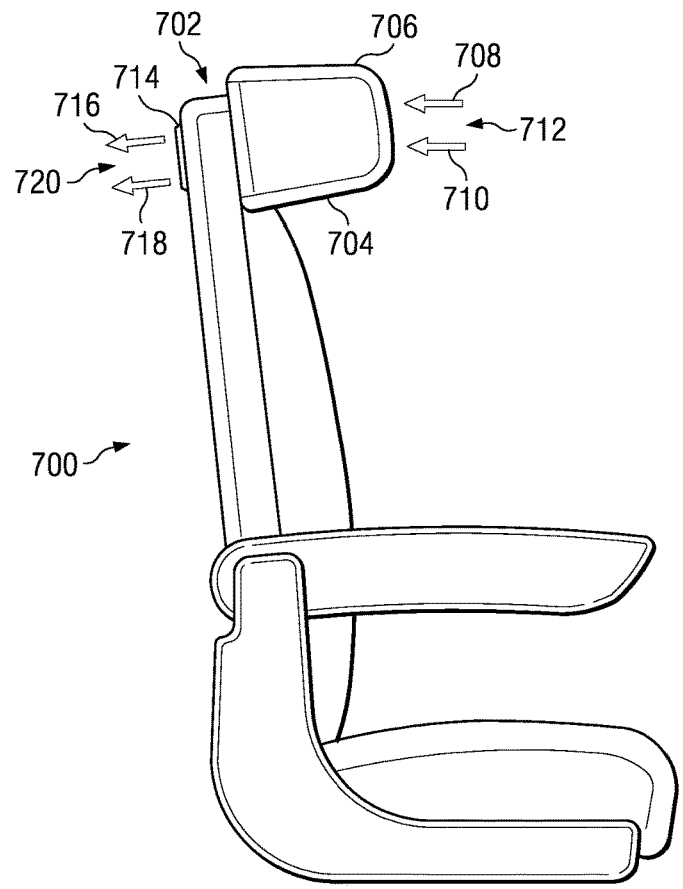
FIG. 7 is diagram of a side view of a seat with a personal ventilation system in accordance with an advantageous embodiment.

With reference now to FIG. 7, a diagram of a side view of a seat with a personal ventilation system is depicted in accordance with an advantageous embodiment. Seat 700 is an example of a seat that may be found in passenger cabin 400 in FIG. 4 and is an example of one implementation for seat 324 in FIG. 3.

Personal ventilation system 702 may be located in headrest 704 in these examples. With this type of implementation, air may be moved into front side 706 of headrest 704 in the direction of arrows 708 and 710 from breathing zone 712. The air may be conditioned through the removal of contaminants as the air moves through headrest 704 and may be expelled from backside 714 in the direction of arrows 716 and 718 into breathing zone 720.

Figure 8:
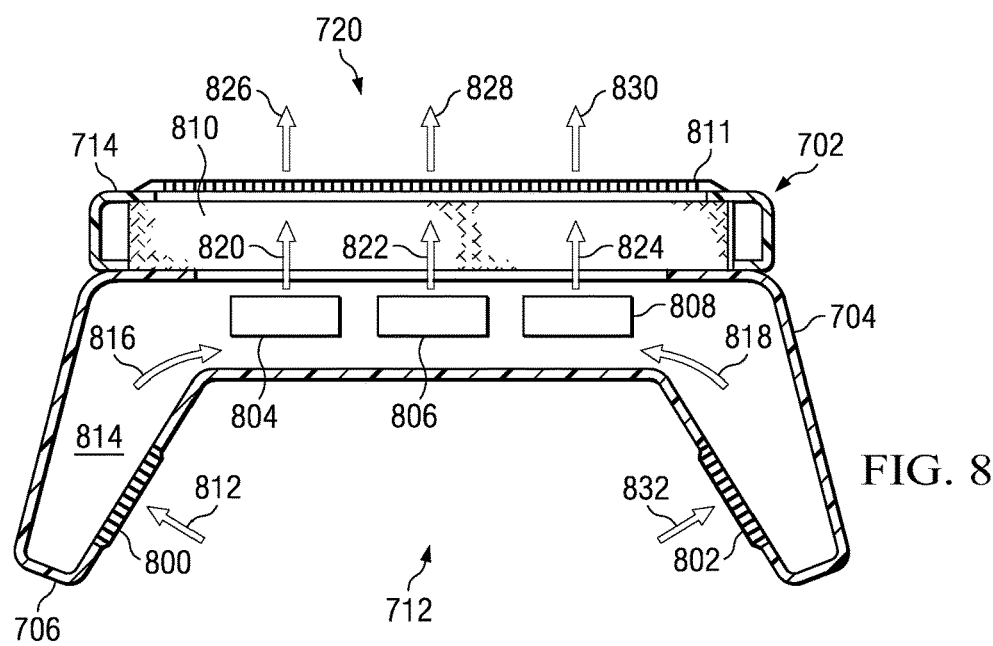
FIG. 8 is a diagram illustrating a top cross-sectional view of a seat with a personal ventilation system in accordance with an advantageous embodiment.

With reference now to FIG. 8, a diagram illustrating a top cross-sectional view of a seat with a personal ventilation system is depicted in accordance with an advantageous embodiment. In this example, personal ventilation system 702 may include inlet 800, inlet 802, fan 804, fan 806, fan 808, filter 810, outlet 811, and duct system 814.

In this example, fans 804, 806, and 808 may draw air from breathing zone 712 into inlets 800 and 802 as indicated by arrows 812 and 832. The air may then travel through duct system 814 of headrest 704 in the direction of arrows 816 and 818 through fans 804, 806, and 808. Fans 804, 806, and 808 may then push air through filter 810 as illustrated by arrows 820, 822, and 824. As air moves through filter 810, contaminants may be removed from the air. The conditioned air may then be expelled through outlet 811 as shown in the direction of arrows 826, 828, and 830 into breathing zone 720.

Figure 9:
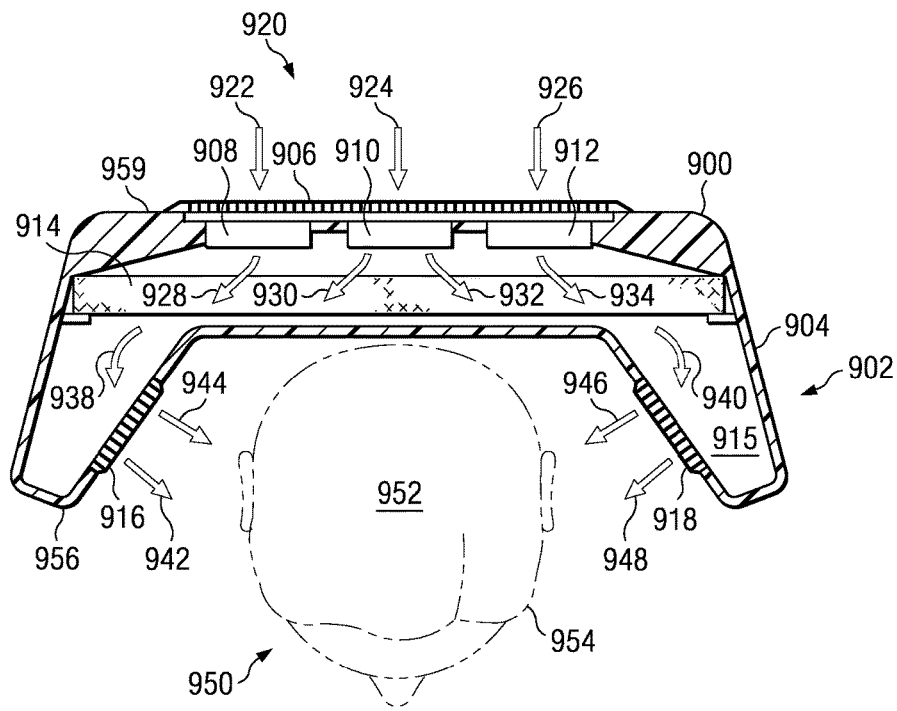
FIG. 9 is a top cross-sectional view of a seat with a personal ventilation system in accordance with an advantageous embodiment.

With reference now to FIG. 9, a top cross-sectional view of a seat with a personal ventilation system is depicted in accordance with an advantageous embodiment. In this embodiment, seat 900 may have personal ventilation system 902 located within headrest 904. Personal ventilation system 902 may include inlet 906, fan 908, fan 910, fan 912, filter 914, duct system 915, outlet 916, and outlet 918.

In this illustrative example, air may be drawn into inlet 906 from breathing zone 920 by fans 908, 910, and 912 in the direction of arrows 922, 924, and 926. Fans 908, 910, and 912 may push the air through filter 914 as shown in the direction of arrows 928, 930, 932, and 934. Filter 914 may remove contaminants from the air to form conditioned air, which may be moved through duct system 915 of headrest 904 in the direction of arrows 938 and 940. The air may then flow out through outlets 916 and 918 in the direction of arrows 942, 944, 946, and 948 into breathing zone 950 around head 952 of passenger 954. As can be seen in this example, air may flow from backside 959 of headrest 904 to frontside 956 of headrest 904.

Figure 10:
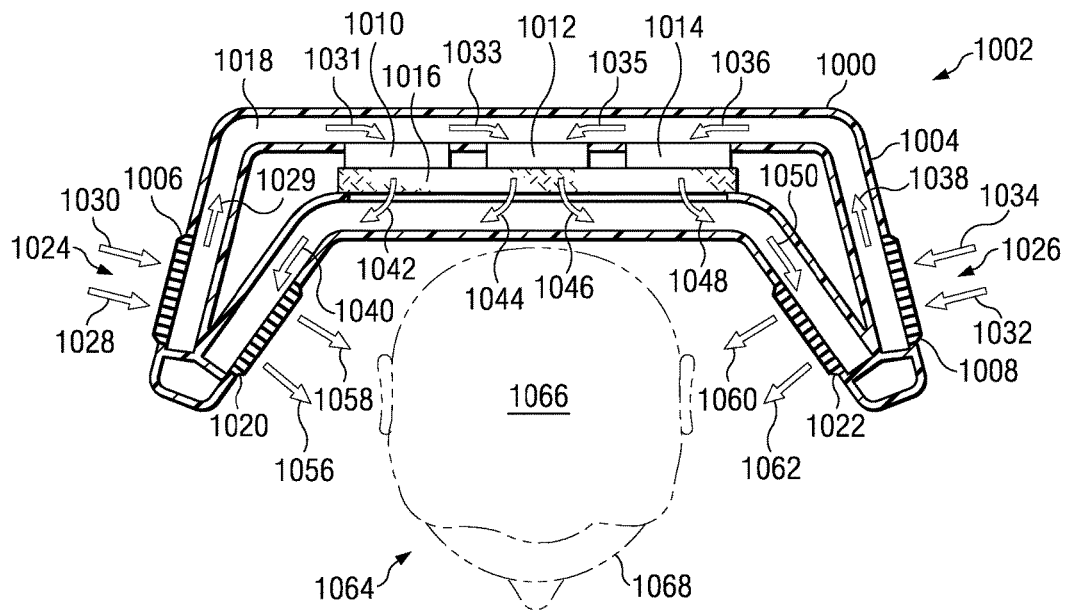
FIG. 10 is a diagram illustrating a top cross-sectional view of a seat with a personal ventilation system in accordance with an advantageous embodiment.

With reference now to FIG. 10, a diagram illustrating a top cross-sectional view of a seat with a personal ventilation system is depicted in accordance with an advantageous embodiment. In this example, seat 1000 illustrates the top cross-sectional view of a seat within passenger cabin 400 in FIG. 4 and is an example of one implementation of seat 324 in FIG. 3.

In this example, seat 1000 may include personal ventilation system 1002 within headrest 1004. Personal ventilation system 1002 may include inlet 1006, inlet 1008, fan 1010, fan 1012, fan 1014, filter 1016, duct system 1018, outlet 1020, and outlet 1022.

In this example, air may be drawn into inlet 1006 and 1008 from breathing zone 1024 and 1026, respectively, as shown by arrows 1028, 1030, 1032, and 1034 by fans 1010, 1012, and 1014. Air may move within duct system 1018 in the direction as shown by arrows 1029, 1031, 1033, 1035, 1036, and 1038. The air may be pushed through filter 1016 to remove contaminants to form conditioned air, which may move in the direction of arrows 1040, 1042, 1044, 1046, 1048, and 1050 within duct system 1018.

The conditioned air may then be expelled through outlets 1020 and 1022 in the direction of arrows 1056, 1058, 1060, and 1062 into breathing zone 1064 around head 1066 of passenger 1068.

The illustration of seats with personal ventilation systems in FIGS. 5-10 are not meant to imply physical or architectural limitations to the manner in which other personal ventilation systems may be implemented. Other personal ventilation systems may be implemented using other components in addition to or in place of the ones illustrated in these examples.

Further, the components may be located in different locations within the seat or in other locations within the passenger cabin depending on the particular implementation. For example, without limitation, the fan and a portion of the duct work may be located within the cabin floor rather than within the seat themselves. In other advantageous embodiments, more than one inlet may be present within a seatback, while in other advantageous embodiments, air may be expelled into a breathing zone from armrests.

Figure 11:
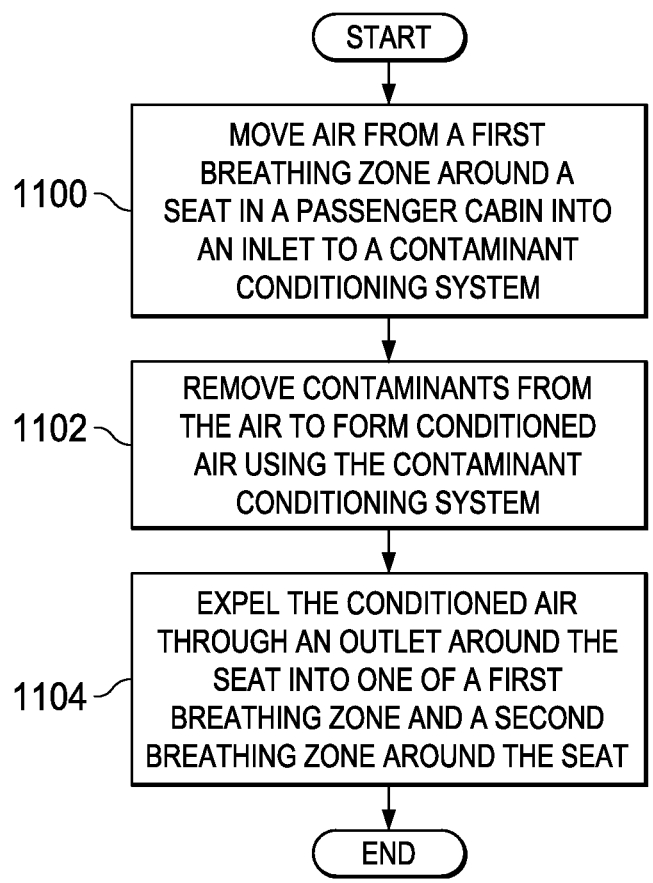
FIG. 11 is a flowchart of a process for processing air in accordance with an advantageous embodiment.

With reference now to FIG. 11, a flowchart of a process for processing air is depicted in accordance with an advantageous embodiment. The process illustrated in FIG. 11 may be implemented using a personal ventilation system such as, for example, without limitation, personal ventilation system 300 in FIG. 3.

The process may begin by moving air from a first breathing zone around a seat in a passenger cabin into an inlet to a contaminant conditioning system (operation 1100). The process may remove contaminants from the air to form conditioned air using the contaminant conditioning system (operation 1102). Next, the process may expel the conditioned air through an outlet around the seat into one of a first breathing zone and a second breathing zone around the seat (operation 1104), with the process terminating thereafter.

Thus, in operation one may find an embodiment that may be an apparatus. The apparatus may include: an inlet capable of receiving air around a seat; a contaminant conditioning system capable of removing contaminants from the air to form conditioned air; an outlet capable of expelling the conditioned air around the seat; and a fan system capable of drawing the air from a breathing zone through the inlet, moving the air drawn from the inlet to the contaminant conditioning system to form the conditioned air, and moving the conditioned air out of the outlet.

An embodiment may also include a duct system connecting the inlet, the fan, the contaminant conditioning system, and the outlet to each other, wherein the outlet comprises a number of nozzles located in the seat. The inlet and the outlet may be located in the seat. The contaminant conditioning system may be located in the seat. The fan system may be located in the seat. The inlet and the outlet may be located in a seatback of the seat. The inlet may be located in a head rest and the outlet may be located in a seat back of the seat.

An embodiment may also include a duct system connecting the inlet, the fan, the contaminant conditioning system, and the outlet to each other, wherein the outlet comprises a number of nozzles located in the seat. The inlet and the outlet may be located in the seat. The contaminant conditioning system may be located in the seat. The fan system may be located in the seat. The inlet and the outlet may be located in a seatback of the seat. The inlet may be located in a head rest and the outlet may be located in a seat back of the seat.

In an embodiment, the conditioned air may be moved back into the breathing zone. The breathing zone may be a first breathing zone and the conditioned air may be moved through the outlet into a second breathing zone.

The contaminant conditioning system may include at least one of: a filter, and an ultraviolet light system. The filter may be a high efficiency particulate air filter.

In an embodiment, the apparatus may be a part of a vehicle; and a passenger cabin located in the vehicle, wherein the inlet, the contaminant conditioning system, the outlet, and the fan system may be located in the passenger cabin. The vehicle may be selected from one of an aircraft, a submarine, a bus, a personnel carrier, a tank, a train, an automobile, a spacecraft, and a surface ship.

In operation, one may find an embodiment that may be an aircraft. The aircraft may include: a passenger cabin for the aircraft; a plurality of seats in the passenger cabin; and a plurality of personal ventilation systems integrated with the plurality of seats in which each personal ventilation system may include: a duct system, an inlet connected to the duct system capable of receiving air; a contaminant conditioning system connected to the duct system and capable of removing contaminants from the air to form conditioned air; an outlet connected to the duct system; and a fan system capable of drawing the air from a breathing zone through the inlet, moving the air drawn from the inlet through the duct system to the contaminant conditioning system to form the conditioned air, and moving the conditioned air from the contaminant conditioning system though the duct system to the outlet.

An embodiment may be a personal ventilation system for conditioning air in a passenger cabin. The personal ventilation system may include: an inlet located in at least one of a head rest and a seatback of a seat, wherein the inlet is capable of receiving the air from around the seat; a contaminant conditioning system located in the seat, wherein the contaminant conditioning system has at least one of a high efficiency particulate air filter and an ultraviolet light system capable of removing contaminants from the air to form conditioned air; an outlet that may have a number of nozzles located in at least one of the head rest and seatback of the seat, wherein the outlet may be capable of expelling the conditioned air around the seat into one of a first breathing zone and a second breathing zone; a fan system capable of drawing the air from the first breathing zone through the inlet, moving the air drawn from the inlet to the contaminant conditioning system to form the conditioned air, and moving the conditioned air out of the outlet; a duct system may connect the inlet, the fan, the contaminant conditioning system, and the outlet to each other; a vehicle. A passenger cabin may be located in the vehicle. The inlet, the contaminant conditioning system, the outlet, and the fan system may be located in the passenger cabin, wherein the vehicle may be selected from one of an aircraft, a submarine, a bus, a personnel carrier, a tank, a train, an automobile, a spacecraft, and a surface ship.

An embodiment may include a method for processing air. The method may include: moving the air around a seat in a passenger cabin into an inlet to a contaminant conditioning system; removing contaminants from the air to form conditioned air using the contaminant conditioning system; and expelling the conditioned air through an outlet around the seat. In the method, the air may be moved from a first breathing zone around the seat into the inlet and expelled through the outlet into a second breathing zone around the seat.

Current aircraft environmental control systems do not prevent exhaled contaminants from a first passenger from being inhaled by a second passenger. Air inhaled by a second passenger is usually drawn from air in the proximity of the headrest of the second passenger's seat, the breathing zone for the second passenger. Thus, in current aircraft, cross infection can occur from the second passenger sitting within a few seat rows of an ill first passenger who is coughing or sneezing.

Current aircraft environmental control systems attempt to minimize passengers from inhaling contaminants by reducing the total number of contaminants in an aircraft cabin. A purity level of the cabin air is commonly defined as a percentage of contaminant free air in a volume of sampled air. Current aircraft environmental control systems do not provide purified air in a personal ventilation system that attempts to control contaminant levels in each individual passenger's breathing zone.

Cabin air purity levels generally increase when the air inside the cabin is replaced by air from outside the cabin. Obtaining more outside air to inject into the cabin has the drawback of increasing aircraft fuel consumption.

As noted above, to reduce aircraft fuel consumption, the aircraft industry has increasingly reduced outside airflow into the cabin. To compensate for the reduced airflow into the cabin, yet maintain allowable cabin air purity levels, the aircraft industry standard has been to add large cabin air recirculation systems that incorporate large high efficiency particulate air filters. Cabin air recirculation systems often include large and powerful fans to draw cabin air through the filters and inject the air back into the cabin. Cabin air recirculation systems may include an air distribution system. Current cabin air distribution systems tend to inject high velocity non-laminar streams of air into the aircraft cabin. Some drawbacks of the high efficiency particulate air filters include efforts required to keep the filters themselves clean, and the fact that the filters will only reduce contaminant counts in air that is drawn into the recirculation system. Such drawbacks may be particularly present when using a centrally located filtering system for an entire cabin.

As a filter fills with particulates, airflow through the filter may be restricted, and a first pressure in the air distribution system on an airflow exit side of a filter may drop from a second pressure in the air distribution system on an airflow entry side of the filter. Other drawbacks of current cabin air recirculation systems include adding weight to the aircraft, increasing cabin noise, and creating drafts or a breezy feeling in the cabin that may be uncomfortable to passengers.

On current aircraft, until contaminants in air exhaled by a first passenger are drawn into the recirculation system and pass through the filter, the contaminants can be inhaled by any other passenger. Current aircraft attempt to overcome this limitation of recirculation systems by injecting and withdrawing air within an aircraft cabin in flow patterns that minimizes airflow along the length of the cabin. This however, does not prevent mixing of the air over several seat rows.

While current systems that minimize airflow along the length of the cabin reduce the chance of a first passenger in a first row from inhaling contaminants exhaled by second passenger in a second row, which may be numerous rows away from the first row, the current systems using high efficiency particulate air filters with recirculated cabin air do not prevent a first passenger in first seat from inhaling contaminants exhaled by a second passenger in second seat when the second seat is adjacent to or nearby the first seat, such as without limitation, within a few seat rows of the first seat. Therefore, what is needed is an apparatus and method of providing each passenger with a breathing zone of purified air that is substantially free from contaminants exhaled by other passengers.

Some aircraft have attempted to provide individual passengers the ability to select an increased reception of recirculated cabin air mixed with outside air through gasper outlets located directly above each passenger seat. Testing has shown that current gasper outlet delivery systems fail to control the airflow enough to ensure that the air inhaled by a passenger is predominantly air delivered by the gasper outlet.

Even with individual passenger gasper outlets, cabin air flow patterns may predominate, and the air that a particular passenger may inhale from their breathing zone may remain a mixture of air that may include contaminants from passengers or objects outside the particular passenger's breathing zone of air that the particular passenger will inhale.

Tests and/or modeling have shown that turbulent flow generated from a current gasper outlet actually entrains air from around the gasper air flow jet and may deliver that air to a passenger's breathing zone. Entrained air drawn into gasper air flow may contain substantial contaminants. Thus, current gasper outlets providing purified air do not prevent cross-contamination of one passenger from contaminants generated by another passenger.

In contrast to current aircraft recirculation environmental control systems, even those with gasper outlets, the embodiments below reveal a method of air delivery such that the air breathed by a passenger may approach being exclusively purified air from the delivery device. Purified air may be air that is substantially free from contaminants. Contaminants may include without limitation bacteria or virus elements, as well as dust, mold, and/or other allergens or irritants. Contaminants may be present in cabin environment from a previous flight, or may be exhaled by current passengers, and/or crewmembers, and/or be present on skin or clothing of current passengers and/or crewmembers.

Thus, the embodiments below illustrate a method and apparatus such that a passenger may inhale purified air substantially without inhaling surrounding ambient air from the cabin. The delivery method may deliver controlled velocity, laminar airflow air that substantially fills a passenger's breathing space, as further described below. To deliver adequate volumes of air to the passenger's breathing space in a laminar flow, the device may utilize an outlet that may be a nozzle. The nozzle may have an outlet area that is contrary to current lower area, high velocity non-laminar air delivery outlets, such as without limitation, gasper outlets. The embodiments shown may provide delivery of purified air that approaches the ventilation effectiveness provided by a breathing mask on a passenger, without the need to wear any mask.

Laminar airflow may act to create a barrier that may minimize mixing with the ambient environment. A delivery nozzle may be screened or may direct air through a baffle or a guide to provide uniform laminar airflow elements from the delivery nozzle discharge that may produce laminar airflow emanating from the delivery nozzle.

For the delivery nozzle to deliver purified air, the air supplied to the delivery nozzle must be purified. Purified air may be delivered from a purified air source. The purified air source may be from a contaminant conditioning system 306 located in seat 324, in accordance with an illustrative embodiment as described above for FIG. 3. The purified air source may also be outside of seat 324 and purified air may be delivered into duct system 310 of seat 324.

As discussed above high efficiency particulate air filters may be used to purify air flow. High efficiency particulate air filters require pressurized air to flow through the filter. Filter size and material composition of a filter may dictate a pressure required for adequate flow through the filter.

A pressurization source, such as without limitation, a fan, is required to generate the pressurization. However, in an environment that may contain hundreds of seats in a confined area, such as without limitation, an aircraft cabin, vibration, and noise levels created by a motor running the fan, a movement of the fan, and/or by the flow of the air itself, may need to be kept down to comfortable levels for each individual passenger at each individual seat, as well as for the combination effect from those components operating in all the seats of the aircraft cabin. Without limitation, U.S. Occupational Safety and Health Administration Noise standards (29 CFR 1910.95) require employers to have a hearing conservation program in place if workers are exposed to a time-weighted average (TWA) noise level of 85 decibels (dBA) or higher over an 8-hour work shift. Thus, supplying the purified air may require a purification system that does not require filters of a size or density that require fans of a size and/or power, or airflow at a rate, that creates excessive noise. It may be desirable to keep noise levels at near a passenger seat headrest below 65 decibels.

Further, testing has shown that if fans are too powerful, they may produce an airflow volume that results in a velocity of air flow near a passenger that is uncomfortably high, and creates a draft. It may be desirable to move flow to a nozzle for delivery into a breathing zone at no more than approximately ten cubic feet per minute.

Additional considerations for in seat purification design systems may include the power draw and source for a motor driving a fan used with a personal ventilation system. Currently, aircraft are wired to provide electrical power to each seat for lighting, recharging of personal electronic, and/or entertainment systems. Air flow velocity and pressure may drop for air flowing through an air filter. To achieve a desired flow and velocity downstream from a filter may require a particular power output from a motor turning a fan. Thus, power availability to run the motor turning the fan may also limit the size and type of filters that may be fitted into a seat in an aircraft cabin. An aircraft environment may not allow for motor weights or power requirements that may be functional in locations such as inside an automobile or in a home or office space.

As mentioned above, ultraviolet light radiation of air flow is a purification alternative to high efficiency particulate air filters. Because ultraviolet purification does not produce the pressure drop of air pushed through high efficiency particulate air filters, ultraviolet purification may allow for much smaller and quieter motors that demand less power as compared to those needed to support a high efficiency particulate air filtered purification system.

Currently, no aircraft environmental control systems are known to use ultraviolet purification. However, this method has been successfully employed in the purification of potable or drinking water aboard ships and aircraft. Typically, ultraviolet radiation is provided by mercury lights. Due to constant vibration in an aircraft, and crashworthiness certification requirements, mercury lights may not be considered a desirable choice for use in an aircraft cabin. Additionally, aircraft tend to have lower humidity levels than a typical home, office, or hospital environment. Limited data exists regarding adequate radiation levels needed in pressure and humidity environments similar to those in an aircraft cabin to inactivate micro organism pathogens such as airborne bacteria and viruses. An alternate source of ultraviolet light may come from light emitting diodes. Ultraviolet pathogen inactivation may be affected by the distance the air may be from the ultraviolet light and the time of exposure. Thus, the size, shape, and coatings of a radiation chamber containing the air flow passing the ultraviolet light, as well as the air flow rate may all determine the effectiveness of an ultraviolet purification system at inactivating pathogens. Within the space, power, and flow restrictions of an aircraft seat, current light emitting diode ultraviolet technology may not provide adequate inactivation of pathogens. Xenon ultraviolet lights may not be appropriate for use in an aircraft cabin because of ozone emission concerns.

Figures 12A, 12B, 12C:
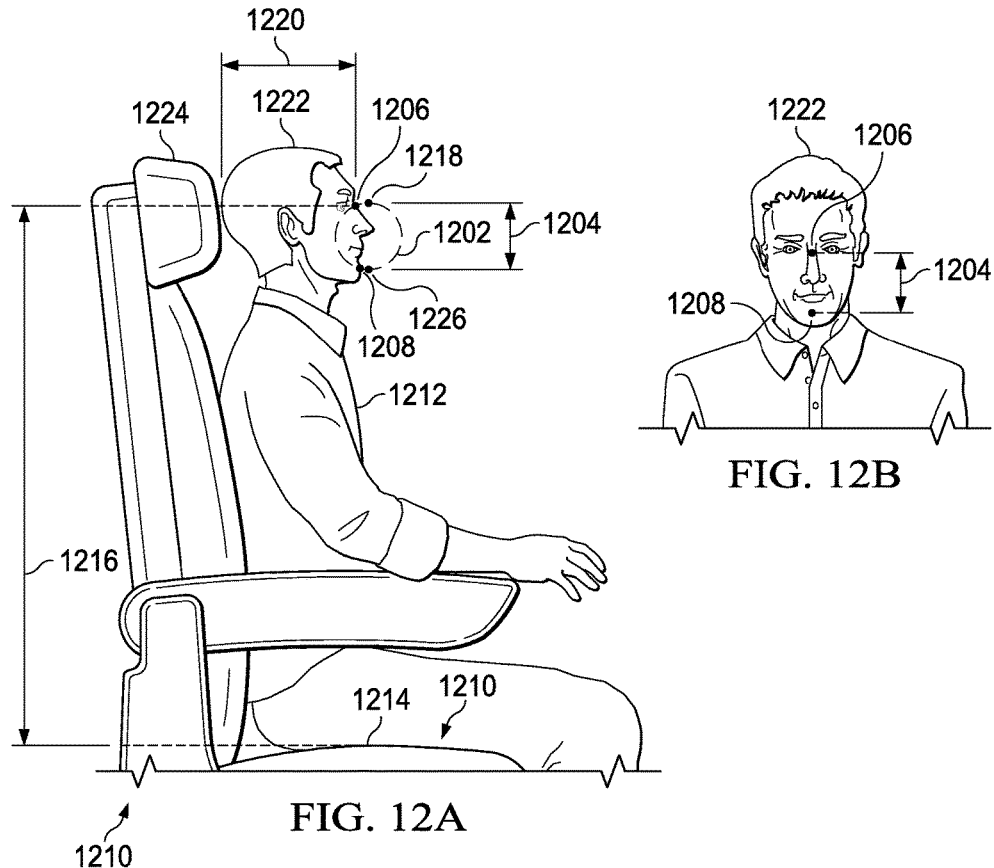
FIG. 12A depicts a side view of an inhalation sphere of an occupant seated in a seat in accordance with an illustrative embodiment.
FIG. 12B depicts a front view of the occupant of the seat in FIG. 12A in accordance with an illustrative embodiment.
FIG. 12C depicts a chart of anthropometry data for the occupant of the seat in FIG. 12A in accordance with an illustrative embodiment.

FIG. 12 depicts anthropometry data, a side view, and a front view for defining dimensions for an inhalation sphere for an occupant seated in a seat in accordance with an illustrative embodiment. FIG. 12A depicts a side view of the inhalation sphere of the occupant seated in the seat in accordance with an illustrative embodiment. FIG. 12B depicts a front view of the occupant of the seat in FIG. 12A in accordance with an illustrative embodiment. FIG. 12C depicts a chart of anthropometry data for the occupant of the seat in FIG. 12A in accordance with an illustrative embodiment.

More specifically, inhalation sphere 1202 may be a volume that may have a diameter 1204. Diameter 1204 may be substantially equal to a distance extending from sellion 1206 to supramenton 1208 on a seated occupant of seat 1210, such as without limitation, a passenger seated in an aircraft. Seat 1210 may be an example, without limitation, of seat 324, seat 600, seat 700, or seat 900 in accordance with an illustrative embodiment as shown in FIG. 3, 6, 7, or 9.

In this embodiment, the seated occupant may be referred to as passenger 1212. Inhalation sphere 1202 may be a volume of air that may be inhaled by passenger 1212 through their mouth and/or nose. Distance 1216 from sellion 1206 down to seat pan 1214 of seat 1210 may be used to determine upper point 1218 of inhalation sphere 1202. Seat pan 1214 may be a substantially planar surface upon which passenger 1212 contacts seat 1210. Thus, relative to seat 1210, upper point 1218 of inhalation sphere 1202 may be located at the intersection of distance 1216 and a distance 1220 from sellion 1206 to the back of head 1222 of passenger 1212, when head 1222 is against headrest 1224 of seat 1210. It is realized that when upper point 1218 is located in this position, that some of a face and a nose of passenger 1212 may intrude into and occupy some portion of inhalation sphere 1202.

Distances measured on a wide range of passenger sizes may be used to establish dimensions for inhalation sphere 1202 such that inhalation sphere 1202 will envelope nose A and mouth A, such that passenger 1212 will only inhale air from inhalation sphere 1202. Based on a Civilian American and European Surface Anthropometry Resource Project, anthropometric data for North America, Chart 1228 gives possible extreme dimensions for passenger 1212, ranging from a large male in the largest 1 percent of the male population down to a small female in the smallest 1 percent of the female population. Thus, if a dimension of diameter 1204 of inhalation sphere 1202 is large enough for the large male, it is large enough for any smaller sized passenger 1212.

However, lower point 1226 of inhalation sphere 1202 positioned with upper point 1218 properly located for the large male will be above upper point 1218 of inhalation sphere 1202 properly located for the small female. Thus, to create a breathing zone of purified air that will envelope a full range of inhalation sphere 1202 for different passenger sizes, without limitation encompassing at least the range of chart 1228, the breathing zone may need to be either adjustable for each individual passenger 1212, envelope the entire dimensions of all the possible inhalation spheres spanned by chart 1228, or some combination thereof such that at least the inhalation sphere of a particular passenger, the particular passenger being at least within the range of chart 1228, may have purified air delivered to suffuse or to fully occupy the dimensions of the particular passenger's inhalation sphere 1202.

Figure 13A:
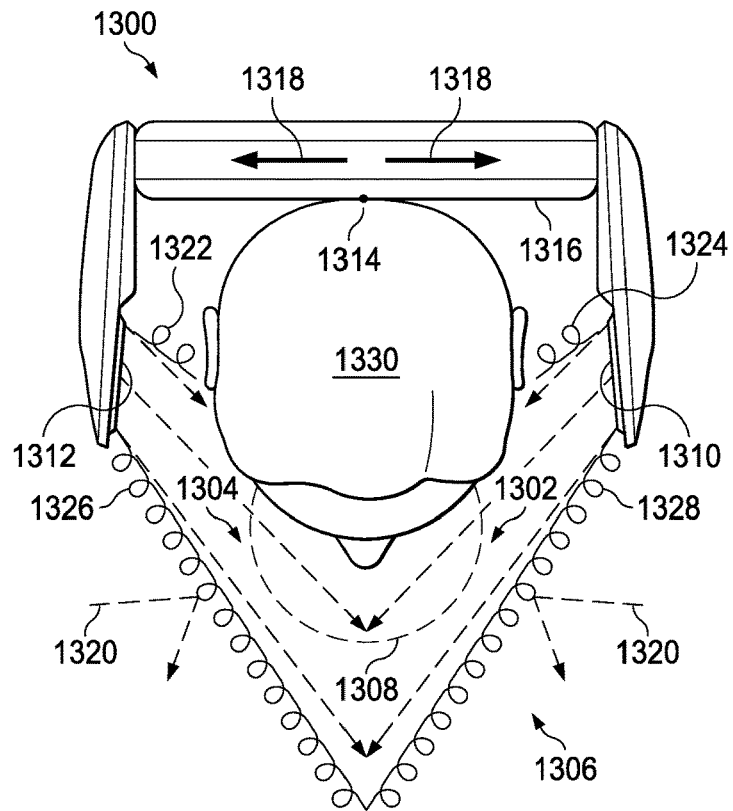
FIG. 13A depicts the overhead view of the breathing space.
Figure 13B:
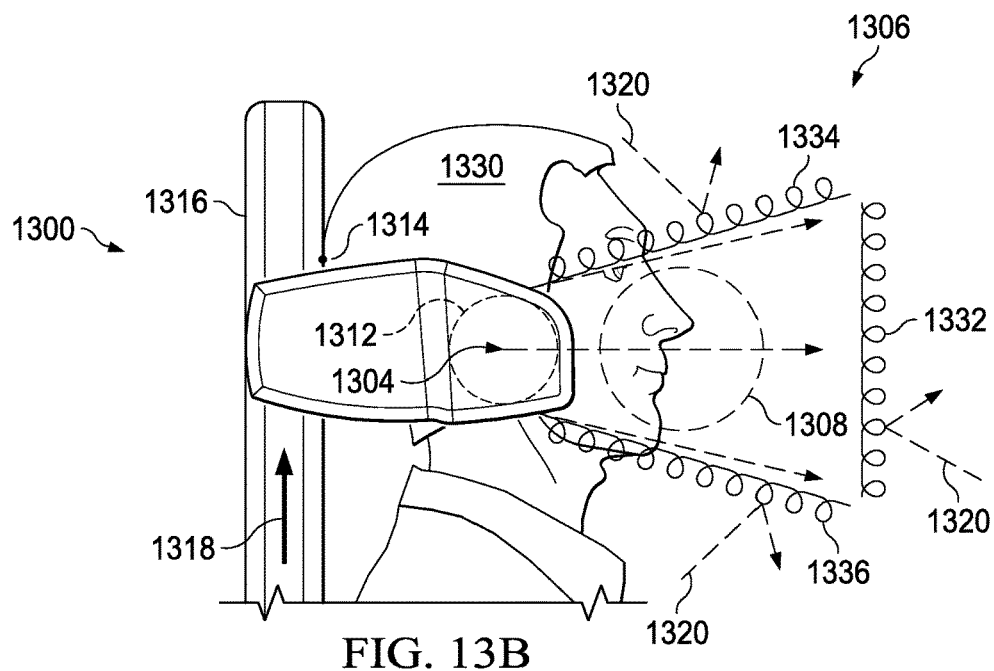
FIG. 13B depicts the side view of the breathing space, in accordance with an illustrative embodiment.

With reference now to FIG. 13, FIG. 13 depicts an overhead view and a side view of a breathing space that may be filled and isolated by a first laminar airflow from a first laminar airflow generator combining with a second laminar airflow from a second laminar airflow generator, in accordance with an illustrative embodiment. FIG. 13A depicts the overhead view of the breathing space; FIG. 13B depicts the side view of the breathing space, in accordance with an illustrative embodiment.

More specifically, FIG. 13 depicts personal ventilation system 1300 whereby at least laminar airflow 1302 may combine with laminar airflow 1304 to form breathing space 1306, in accordance with an illustrative embodiment. Personal ventilation system 1300 may be an example of personal ventilation system 300 as shown in FIG. 3, in accordance with an illustrative embodiment. An outside edge of laminar airflow 1302 may function as barrier 1328 and as barrier 1324. An outside edge of laminar airflow 1304 may function as barrier 1326 and as barrier 1322.

Breathing space 1306 may be bounded by barrier 1328 and by barrier 1326. Each barrier may impede transgression of ambient air 1320 from crossing through the respective barrier and entering into breathing space 1306. Each barrier may retain purified air 1318 from crossing through the respective barrier and exiting breathing space 1306.

Purified air 1318 may be delivered from a purified air source. The purified air source may provide air that is free of virus and/or bacterial contaminants or other allergens and/or irritants that may come from any origin, such as without limitation, the exhalation of any other person, or any item, clothing, and/or skin of anyone near and/or in seat 324 or passenger cabin 301, in accordance with an illustrative embodiment as shown above in FIG. 3.

Breathing space 1306 may also be formed using a third or more laminar flow generator (not shown). Breathing space 1306 may occupy a volume of air that may provide a source of air that may suffuse or fill and envelope inhalation sphere 1308 for passenger 1330. Passenger 1330 may be an example of passenger 1212, in accordance with an illustrative embodiment as shown in FIG. 12.

Laminar airflow 1302 may exit laminar airflow generator 1310 and laminar airflow 1304 may exit laminar airflow generator 1312. Each laminar airflow generator may include without limitation an outlet, which may be a nozzle, such as without limitation, airflow nozzles 334 as shown in accordance with an illustrative embodiment in FIG. 3 above. Laminar airflow generator 1310 may have an outlet on a side that faces laminar airflow generator 1312, and laminar airflow generator 1312 may have an outlet on a side that faces laminar airflow generator 1310 such that laminar airflow 1302 may meet and combine with laminar airflow 1304 to form breathing space 1306.

Laminar airflow generator 1310 and laminar airflow generator 1312 may be of similar design and/or construction, of inverse design and/or construction relative to each other, of unique design and/or construction relative to each other, or of any combination thereof. Each laminar airflow generator may include, an outlet, a nozzle, an airflow guide system, a baffle, or any structure such that air flow exiting each laminar airflow generator may exit with a respective shape, flow rate, and velocity distribution, as may be described in further detail below.

Air flow exiting from each laminar airflow generator, without limitation such as laminar airflow 1302 or laminar airflow 1304, may remain laminar for a distance from each laminar airflow generator such that without limitation, laminar airflow 1302 and barrier 1328 from first laminar airflow generator 1310 may combine with laminar airflow 1304 and barrier 1326 from laminar airflow generator 1312.

Barrier 1326 may meet and join barrier 1328 in front of passenger 1330 and thus act as barrier 1332 that may seal off the front of breathing space 1306 and impede any ambient air 1320 from transgressing through barrier 1332 to enter into breathing space 1306 or inhalation sphere 1308 within breathing space 1306.

Laminar airflow 1304 is shown in FIG. 13B as also forming barrier 1334 above breathing space 1306 and barrier 1336 below breathing space 1306. Laminar airflow 1304 thus may impede transgression of ambient air 1320 into breathing space 1306 from above or below breathing space 1306. FIG. 13B also shows barrier 1332 where laminar airflow 1304 combines with laminar airflow 1302 in front of breathing space 1306.

Although laminar airflow 1302 is not shown in FIG. 13B, laminar airflow 1302 may be considered to perform similarly to laminar airflow 1304, but on the side of passenger 1330 not shown. Thus, laminar airflow generator 1310 may generate laminar airflow 1302 similar to laminar airflow 1304 shown in FIG. 13B, and contribute to barrier 1334 above breathing space 1306, and barrier 1336 below breathing space 1306.

Breathing space 1306 may fully occupy a height approximately from at least 26.5 to at least 35.5 inches above seat pan 1214, or any part thereof. Breathing space 1306 may have a depth extending at least out to approximately 13.5 inches forward from point 1314, or any part thereof. Point 1314 may be where a back of a head of passenger 1330 may contact headrest 1316. Headrest 1316 may be an example of headrest 1224 of seat 1210, in accordance with an illustrative embodiment as shown in FIG. 12. Breathing space 1306 may have a width that extends from laminar airflow generator 1310 to laminar airflow generator 1312, or any part thereof.

Testing of the embodiment as shown in FIG. 13 produced laminar airflow 1302 and laminar airflow 1304 that displaced ambient air 1320 in breathing space 1306 with purified air supplied to laminar airflow generator 1310 and laminar airflow generator 1312 respectively. Ambient air 1320 may be air outside of breathing space 1306. Ambient air 1320 may be a cabin air that occupies the same volume of space that becomes breathing space 1306 before laminar airflow generator 1310 and laminar airflow generator 1312 may begin to operate and create breathing space 1306 by displacing the cabin air in that space with purified air 1318. Thus, laminar airflow 1302 and laminar airflow 1304 may suffuse or substantially fill breathing space 1306 with purified air 1318.

Testing of the embodiment as shown in FIG. 13 produced an outer edge for each laminar airflow 1302 and laminar airflow 1304 that each effectively act as barrier 1322-1328 and 1332-1336 such that ambient air 1320 outside of breathing space 1306 may not be entrained into laminar airflow 1302 or laminar airflow 1304, or be able to cross through laminar airflow 1302 or laminar airflow 1304 into breathing space 1306. Thus, laminar airflow 1302 and laminar airflow 1304 substantially isolate and fill breathing space 1306 with purified air.

As such, laminar airflow generator 1310 and laminar airflow generator 1312 effectively suffuse or substantially fill inhalation sphere 1308 with purified air, thereby effectively forming a breathing mask or breathing hood that envelopes a mouth and nose of passenger 1330 without corporeal features or tangible mask parts, a corporeal free mask. Despite being corporeal free, the breathing space 1306 nonetheless fills, covers, and isolates inhalation sphere 1308 by delivering purified air into inhalation sphere 1308 for passenger 1330 to breathe, to much the same effect as if passenger 1330 were actually wearing a breathing mask or protective breathing equipment (PBE) such as a hood.

Hence, unlike previous attempts to isolate a breathing zone by providing a single wall of airflow, or that drop conditioned air down upon a receiver, such as shown in U.S. Pat. No. 7,037,118, the illustrated embodiments may blend laminar airflows to form and isolate a three dimensional breathing space 1306. In further contrast to systems such as shown in U.S. Pat. No. 7,037,118, laminar airflow generators of the illustrated embodiments may be tailored to suffuse inhalation sphere 1308 within breathing space 1306 with purified air. Thus, unlike airflows generated by systems such as shown in U.S. Pat. No. 7,037,118, laminar airflow generators of the illustrated embodiments may provide laminar airflows that may not entrain contaminants into breathing space.

Thus, personal ventilation system 1300 may include laminar airflow generators, such as without limitation, laminar airflow generator 1310 and laminar airflow generator 1312. Each laminar airflow generator may provide purified air 1318, which has been purified without limitation as described above, to inactivate bacterial and viral contaminants, such as without limitation, *Bacillus subtilis, Mycobacterium parafortuitum, Pseudomonas auriginosa,* Coronavirus, Parainfluenza, Poxvirus, Picornavirus, Paramyxovirus.

Air supplied to each laminar airflow generator may be purified air 1318. Purified air 1318 may be delivered to, without limitation, laminar airflow generator 1312. Purified air 1318 may be delivered to passenger 1330 seat, without limitation such as seat 1210 or, or produced within seat 1210 as described above. Seat 1210 may therefore include a contaminant conditioning system that, unlike a mere ventilating device and aroma generator such as described by U.S. Pat. No. 5,102,189, may actually inactivate or filter out viral and bacterial contaminants, and thus impede or prevent passenger 1330 from inhaling viral and bacterial contaminants.

Each laminar airflow generator may be supplied with varying volumes of purified air per minute. Testing was conducted for the illustrative embodiments providing purified airflow to each laminar airflow generator at 6 to 10 cubic feet per minute. Testing, of laminar airflow generators receiving purified air 1318 shows that two laminar airflow generators creating breathing space 1306, provide an 85% transfer efficiency. With an 85% transfer efficiency, 85% of air inhaled by passenger 1330, may be purified air 1318 that may be supplied to the laminar airflow generators, when each laminar airflow generator may be supplied either 8 to 10 cubic feet per minute of purified air 1318. Additional laminar airflow generators may be added to improve transfer efficiency and concentration of the purified air in breathing space 1306. Additional laminar airflow generators may be added to increase the size of breathing space 1306.

Purified air 1318 may be provided to both laminar airflow generator 1310 and laminar airflow generator 1312 using, without limitation, a fan located in seat 1210 moving purified air through a duct system, such as without limitation, duct system 310, 510, 610, or 814 as described above for FIG. 3, 5, 6, or 8. Because there are limits on the amount of power available from an aircraft's generators, a requirement may exist that the fan may, without limitation, draw less than 25 watts of power run on single phase 115 volt alternating current supplied to seat 1210 at 400 hertz. Thus, using at least two laminar airflow generators may effectively generate a corporeal-less breathing hood or mask around the inhalation sphere 1308 for passenger 1330.

Figure 14A:
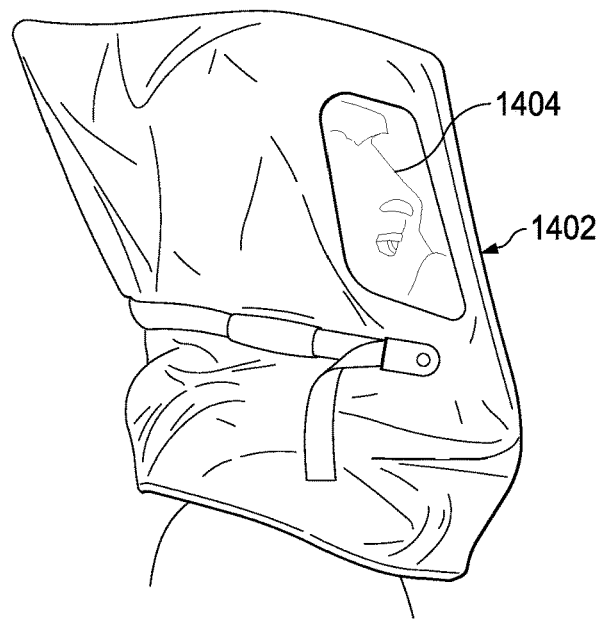
FIG. 14A depicts a side view of a hood to provide a user with a purified air for breathing.

With reference to FIG. 14, FIG. 14 depicts profile views of three purified air delivery methods, two current methods and one using a laminar airflow generator, in accordance with an illustrative embodiment. FIG. 14A depicts a side view of a hood to provide a user with a purified air for breathing.

More specifically, FIG. 14A shows a hood 1402 that functions as protective breathing equipment (a PBE) worn by user 1404. User 1404 may be an example of passenger 1330 as shown in FIG. 13, in accordance with an illustrative embodiment. Hood 1402 may typically have a seal around a neck of user 1404. The seal around the neck of user 1404 may prevent air from outside hood 1402, from being inhaled by user 1404. A source of purified air inside hood 1402 may be activated to provide a supply of purified air (not shown) to user 1404. The supply of purified air in hood 1402 may be 100% oxygen. The supply of oxygen from hood 1402 may have a limited duration.

Figure 14B:
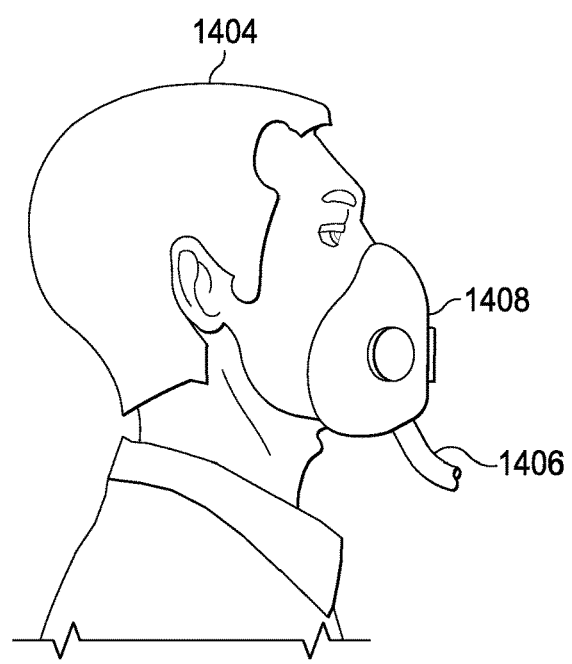
FIG. 14B depicts a side view of a mask to provide a user with a purified air for breathing.

FIG. 14B depicts a side view of a mask to provide a user with a purified air for breathing. Mask 1408 is typically made with tangible, corporeal, features, such as without limitation, a plastic shell with a silicon mold interior that seals around a mouth and a nose of user 1404. Mask 1408 may be connected to a limited or extensive supply of pure oxygen via a tangible, corporeal, connection such as hose 1406. Typically, mask 1408 may include a valve that allows the mask to supply user 1404 with pure oxygen. Typically, mask 1408 may exclude user 1404 inhalation of any air from outside mask 1408. The valve may also be adjusted to allow a mix of pure oxygen and some air from outside the mask.

Figure 14C:
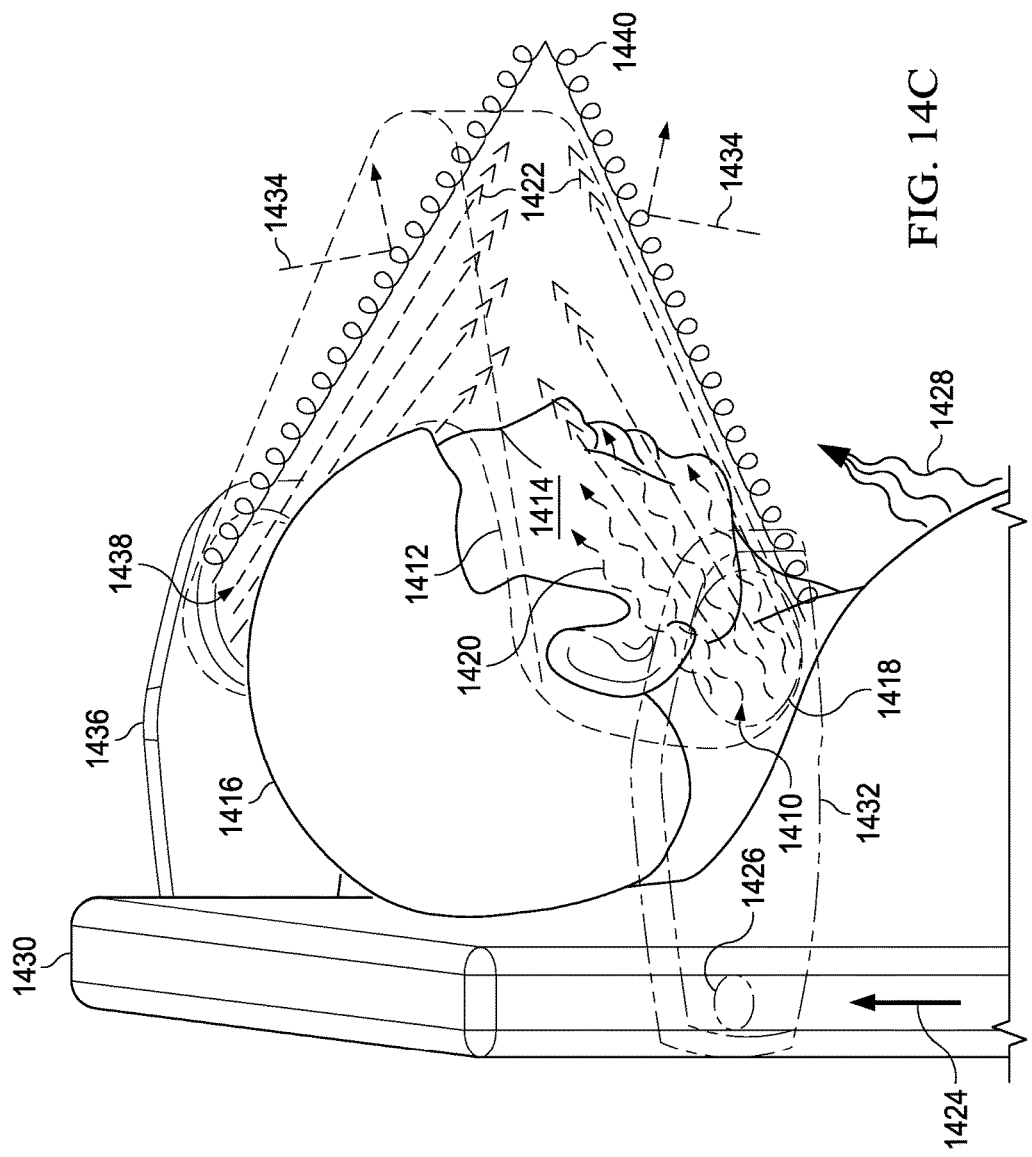
FIG. 14C depicts a perspective view of a laminar flow generated breathing zone, in accordance with an illustrative embodiment.

With reference now to FIG. 14C, FIG. 14C depicts a perspective view of a laminar flow generated breathing zone. Similarly, combinations of laminar airflow generators such as laminar airflow generator 1418 may provide purified air 1424 to passenger 1416. Laminar airflow generator 1418 and laminar airflow 1410 may be examples of laminar airflow generator 1312 generating laminar airflow 1304, in accordance with an illustrative embodiment as shown in FIG. 13. Characteristics and performance of laminar airflow generator 1418 and resultant laminar airflow 1410 may also be characteristic of other laminar airflow generated by other laminar airflow generators such as, without limitation laminar airflow generator 1310 and laminar airflow generator 1302.

Generating laminar airflow 1410 such that it fills and isolates breathing space 1412, in combination with laminar airflow 1438, may require that laminar airflow 1410 have sufficient velocity to form barrier 1440 against intrusion from adjacent ambient air 1434 into breathing space 1412, yet remain at a velocity that is low enough to avoid becoming turbulent and/or non-laminar. The moment that 1410 becomes turbulent it may begin to entrain ambient air 1434 into the breathing space 1412. Ambient air 1434 may be an example of ambient air 1320 in accordance with an illustrative embodiment such as FIG. 13. Non-laminar airflow into breathing space 1412 may induce entrainment of air from outside breathing space 1412 into breathing space 1412. Laminar airflow 1410, laminar airflow 1438, and breathing space 1412 may be examples of laminar airflow 1304, laminar airflow 1302, and breathing space 1306, in accordance with an illustrative embodiment as shown in FIG. 13.

Testing shows that supplying each laminar airflow generator with 8 cubic feet per minute of air may generate velocities as high as approximately 200-220 feet per minute within each laminar airflow 1410, and/or laminar airflow 1438. Each laminar airflow may effectively perform as a barrier against entraining air outside laminar airflow 1410, ambient air 1434, into laminar airflow 1410. Each laminar airflow may effectively form barrier 1440 and inhibit allowing penetration of ambient air into breathing space 1412.

Testing has shown that flow rates into laminar airflow generator 1418 and/or laminar airflow generator 1436 that are greater than approximately 10 cubic feet per minute may produce airflow velocities exiting each laminar airflow generator that exceed 225 feet per minute. Velocities within an airflow that exceed 230 feet per minute may be so great that airflow may not remain laminar, but may become turbulent. Turbulent airflow may entrain ambient air into the turbulent airflow, and may not perform as an effective barrier that inhibits penetration of ambient air into breathing space 1412.

Testing also shows that blowing air at high velocities against face 1414 of passenger 1416 may be uncomfortable to passenger 1416. Without limitation to the types or sources of discomfort, airflows near human eyes in excess of 30 feet per minute may uncomfortably dry out a desired moisture level of the eyes. Testing showed that velocities down to approximately 20 feet per minute near face 1414 in laminar airflow 1410 may still fill breathing space 1412 between face 1414 and each laminar airflow generator without causing discomfort on face 1414 of passenger 1416. Passenger 1416 may be an example of passenger 1330, in accordance with an illustrative embodiment as in FIG. 13.

Filling breathing space 1412 with purified air 1424 and isolating ambient air 1434 exterior to breathing space 1412 from entering into breathing space 1412 without causing discomfort to face 1414 of passenger 1416 may be accomplished by varying the velocity and/or the direction of air exiting each laminar airflow generator differentially across a respective outlet of each laminar airflow generator. Thus, without limitation laminar airflow 1410 may include a gradient that may include a first part 1420 (indicated by waved lines), which may contact face 1414 may be directed at first angles and/or first velocities that may fill breathing space 1412, but remain below a threshold that may discomfort passenger 1416. A velocity of flow indicated by first part 1420 may be less than 30 feet per minute.

Simultaneously, laminar airflow 1410 may include a gradient that may include a second part 1422 (indicated by spiked lines) which may be directed at second angles and/or second velocities that do not affect face 1414. Second part 1422 may strengthen the perimeter barrier of breathing space 1412. Velocities of flow indicated by second part 1422 may be greater than the first velocities. Velocities of flow indicated by second part 1422 may be up to 220 feet per minute. Velocity gradients across the outlet of laminar airflow generator 1418 may be tailored at a smooth gradient such that laminar airflow 1410 is produced without a velocity differential gradient that may result in turbulent instead of laminar flow.

Furthermore, without limitation laminar airflow generator 1418 may be tailored to alter a dimension and direction of laminar airflow 1410 such that a location and/or a dimension of breathing space 1412 may be altered to adjust for varying sizes of passenger 1416. A component, such as without limitation, a louver, a screen, a baffle, a guide vane, a size, a shape, and/or a location of an outlet associated with laminar airflow generator 1418 may each be added or varied separately or in varying combinations to tailor a size, a shape, and/or a velocity characteristic of any part of laminar airflow 1410 so as to vary size, a shape, and/or a location of breathing space 1412.

Additionally, without limitation, mount 1426 for laminar airflow generator 1418 may be adjustable, such that a height above seat pan 1214 or a distance from headrest 1224 may be altered for an outlet of laminar airflow generator 1418. Without limitation, laminar airflow generator 1418 may have an outlet that may be on winged extension 1432 from headrest 1430 mounted around a duct system in headrest 1430 via a turntable pivot.

Extension 1432 may contain parts that may include: a duct system such as, without limitation, duct system 310 or any part thereof as shown in FIG. 3, a tube, a guide, a vane, a baffle, an outlet, or any part that may facilitate generation of a desired laminar airflow such as, without limitation, laminar airflow 1410 that includes a gradient of velocities as described above. An outlet for extension 1432 of laminar airflow generator 1418 may have any shape that produces laminar airflow 1410 as desired to produce breathing space 1412. Without limitation, the outlet in extension 1432 of laminar airflow generator 1418 may be circular, or may be formed as a nozzle of any size or shape that may facilitate generation of a desired laminar airflow such as, without limitation, laminar airflow 1410 that includes a gradient of velocities as described above. Without limitation, the outlet for extension 1432 may be an example of airflow nozzles 334 as shown in FIG. 3 in accordance with an illustrative embodiment. Features discussed above for extension 1432 of laminar airflow generator 1418 and laminar airflow 1410 may apply similarly to laminar airflow generator 1436 and laminar airflow 1438, as well as to any other laminar airflow generator that may be added.

Additionally, any duct system connecting laminar airflow generator 1418 to a fan system, and/or a filter system incorporated with any duct systems to laminar airflow generator 1418, may be tailored to produce laminar airflow 1410 such that it fills and isolates breathing space 1412, such that breathing space 1412 envelopes inhalation sphere 1202 for passenger 1416.

Separate duct systems may be connected to different portions of an outlet of a laminar airflow generator, such as, without limitation, laminar airflow generator 1418, to tailor vector composition of a laminar flow, such as, without limitation, laminar airflow 1410. Laminar airflow generator 1418 and components supporting laminar airflow generator 1418, without limitation including fans, duct systems, and/or filters may each separately or in combination be modified, insulated, and/or muffled to keep a noise level near headrest 1430 below 65 decibels. Testing of illustrative embodiments shown has resulted in a decibel level of 52 near headrest 1430.

Additionally, in commercial aircraft, laminar airflow generator 1418 and components supporting laminar airflow generator 1418, which may include without limitation a fan, a duct system, and/or a filter that may each be integrated with seat 1210 such that seat 1210 remains compliant with all applicable crashworthiness requirements of the Federal Aviation Administration. Personal ventilation system 300 may be required to remain attached to seat 1210 during decelerations of up to 16 times the force of gravity and be designed to minimize blunt force trauma if impacted by a passenger during such conditions. Without limitation, such requirements may include 14 CFR § 121.311(j) and 14 CFR § 25.562; § 25.601; § 25.785; and/or § 25.789.

Operational flight loads on personal ventilation system 300 components may also be accommodated. Typically, transport aircraft may be rated to operate from negative one to positive 2.5 times the force of gravity, experienced during aircraft maneuvering and turbulence. Additionally, landing loads of up to 8 times the force of gravity may be experienced. Thus, all components of personal ventilation system may be required to function under operational loads rated for the aircraft. Further, in an aircraft environment, additional weight to any part of an aircraft increases fuel consumption and operating cost of the aircraft. Thus, all the components of personal ventilation system 300 added in to seat 1210 should not exceed a total of two pounds.

An aircraft operational schedule may impart numerous power cycles and extensive adjustment of a recline angle of seat 1210, and adjustments of extension 1432 and other components of personal ventilation system 300. Thus, components of personal ventilation system 300 may be configured for a service life of 40,000 hours mean time between replacement.

Testing also validated that embodiments of a method for generating a corporeal-less mask that envelopes via at least two laminar airflow generators such as laminar airflow generator 1418, as shown in accordance with an illustrative embodiment in FIG. 14C, will overcome and/or repel an airflow intrusion 1428 into breathing space 1412 whether airflow intrusion 1428 emanates from a thermal body plume, a water vapor buoyancy effects, and/or an ambient cabin airflow with a velocity below approximately 40 feet per minute.

Figure 15:
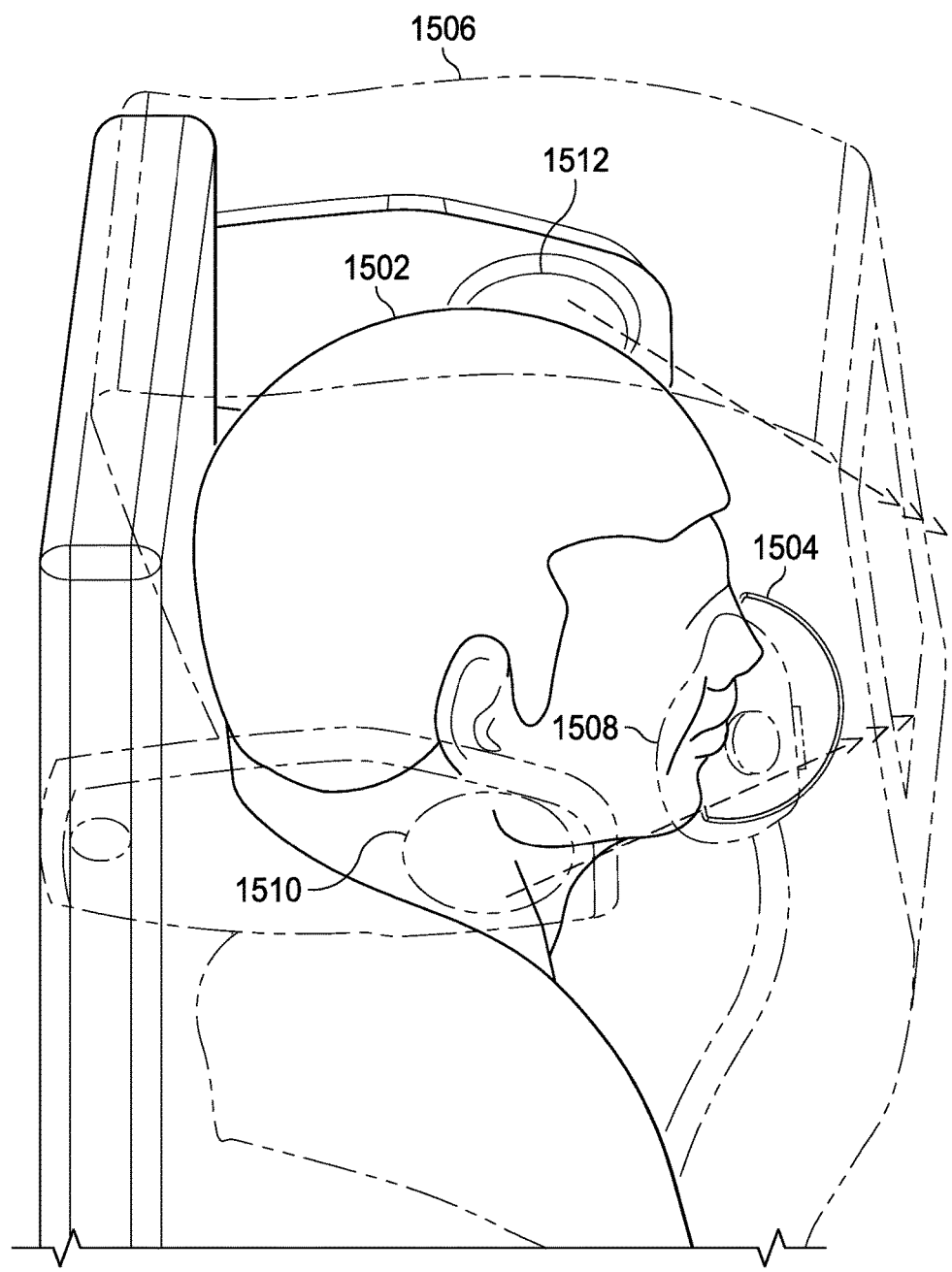
FIG. 15 depicts a perspective view of an occupant of a seat contrasting the positioning of a hood, a breathing mask, and an inhalation sphere of a personal ventilation system, in accordance with an illustrative embodiment.

With reference now to FIG. 15, FIG. 15 depicts a perspective view of an occupant of a seat contrasting the positioning of a hood, a breathing mask, and an inhalation sphere of a personal ventilation system, in accordance with an illustrative embodiment. More specifically, passenger 1502 may receive purified air into an inhalation sphere 1504 of passenger 1502 via hood 1506 and via mask 1508.

A personal ventilation system using laminar airflow generators, such as without limitation, laminar airflow generator 1510 and laminar airflow generator 1512, to fill a breathing space, such as breathing space 1412, as shown above in accordance with an illustrative embodiment in FIG. 14C, with purified air that envelopes inhalation sphere 1504, passenger 1502 may receive purified air from inhalation sphere 1504 without the need for any corporeal features contacting any part of a body of passenger 1502. Thus, personal ventilation system 300 allows passenger 1502 to receive purified air without any corporeal feature, such as without limitation, hood 1506 and/or mask 1508, contacting a face of passenger 1502.

Thus, laminar airflow generator 1510 and laminar airflow generator 1512 effectively generate a corporeal free breathing mask that envelopes inhalation sphere 1504 of passenger 1502. The corporeal free breathing mask generated at least by laminar airflow generator 1510 and laminar airflow generator 1512 may provide passenger 1502 purified air without any corporeal delivery apparatus contacting passenger 1502.

Thus, the embodiments above may show an apparatus that may support a method of generating a first barrier including a first laminar airflow and a second barrier including a second laminar airflow, each barrier may be configured to converge and form and fill a breathing space including purified air that may envelope an inhalation sphere of an occupant of a seat.

Figure 16:
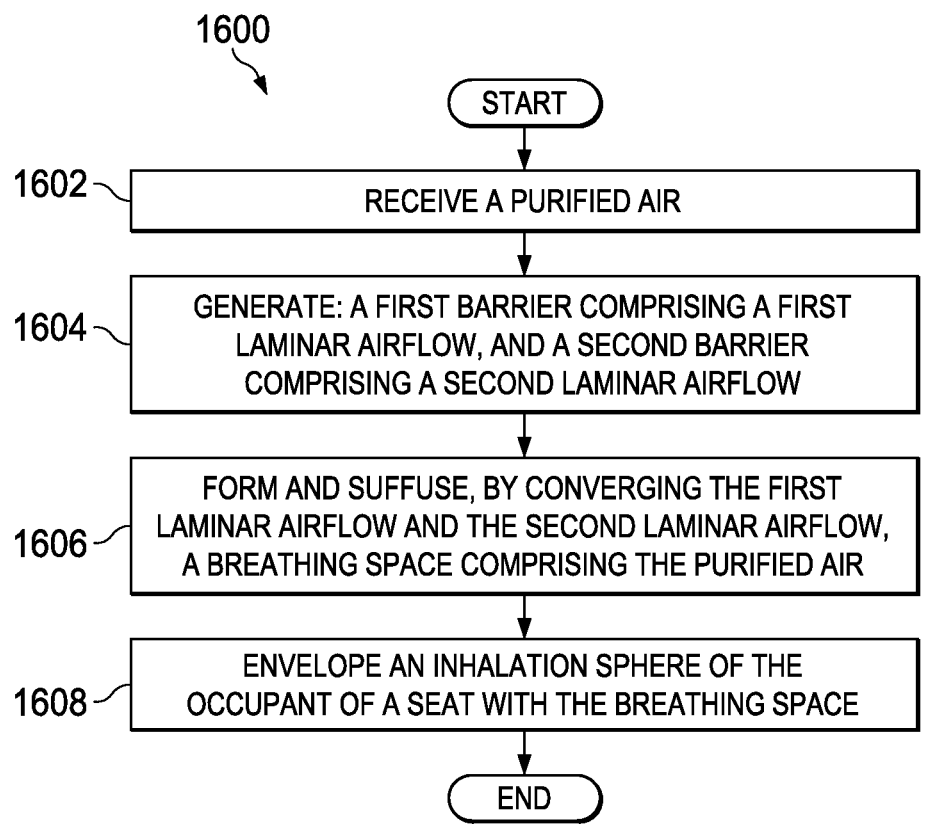
FIG. 16 depicts a flowchart of a method of providing purified air to an occupant of a seat.

With reference now to FIG. 16, FIG. 16 depicts a flowchart of a method of providing purified air to an occupant of a seat. More specifically, method 1600 may include the operations listed below. Method 1600 may start with operation 1602 and end with operation 1608.

Method 1600 may begin by receiving a purified air (operation 1602). Receiving a purified air may include:

receiving an ambient air into a contaminant conditioning system located in a seatback of the seat; purifying the ambient air in the contaminant conditioning system; and delivering the purified to at least one of: a first laminar airflow generator, and a second laminar airflow generator. Each laminar airflow generator may include an extension substantially perpendicular to a headrest of the seat.

Method 1600 may include generating: a first barrier that may include a first laminar airflow, and a second barrier that may include a second laminar airflow (operation 1604). In operation 1604, generating may include delivering purified air: to a first laminar airflow generator, and to a second laminar airflow generator. In operation 1604, generating may include ejecting laminar airflow from each laminar airflow generator.

Method 1600 may include forming and suffusing, by converging the first laminar airflow and the second laminar airflow, a breathing space that may include the purified air (operation 1606). The breathing space may be located in front of the seat. Breathing space may form a hood lacking corporeal features, such that the hood surrounds an inhalation sphere for the occupant.

In operation 1606, each laminar airflow may include a gradient that may include: a first part 1420 of laminar airflow 1410 that may contact a face of the occupant at a first 1410 velocity that may be comfortable for the occupant, and a second part 1422 of laminar airflow 1410 at a second velocity that is greater than the first velocity. Each barrier may function for impeding ambient air from crossing each barrier respectively and entering the breathing space. The first part may include laminar airflow with a velocity of less than 25 feet per second with a flow rate less than 10 cubic feet per minute. The second part 1422 may include a laminar airflow of less than 220 feet per minute with a flow rate of less than 10 cubic feet per minute.

Method 1600 may include enveloping an inhalation sphere of an occupant of the seat with the breathing space (operation 1608). Operations listed for method 1600 may be performed in an order other than that presented. Some operations may be performed simultaneously. Some operations may be omitted. Operations other than those listed may be added.

Figure 17:
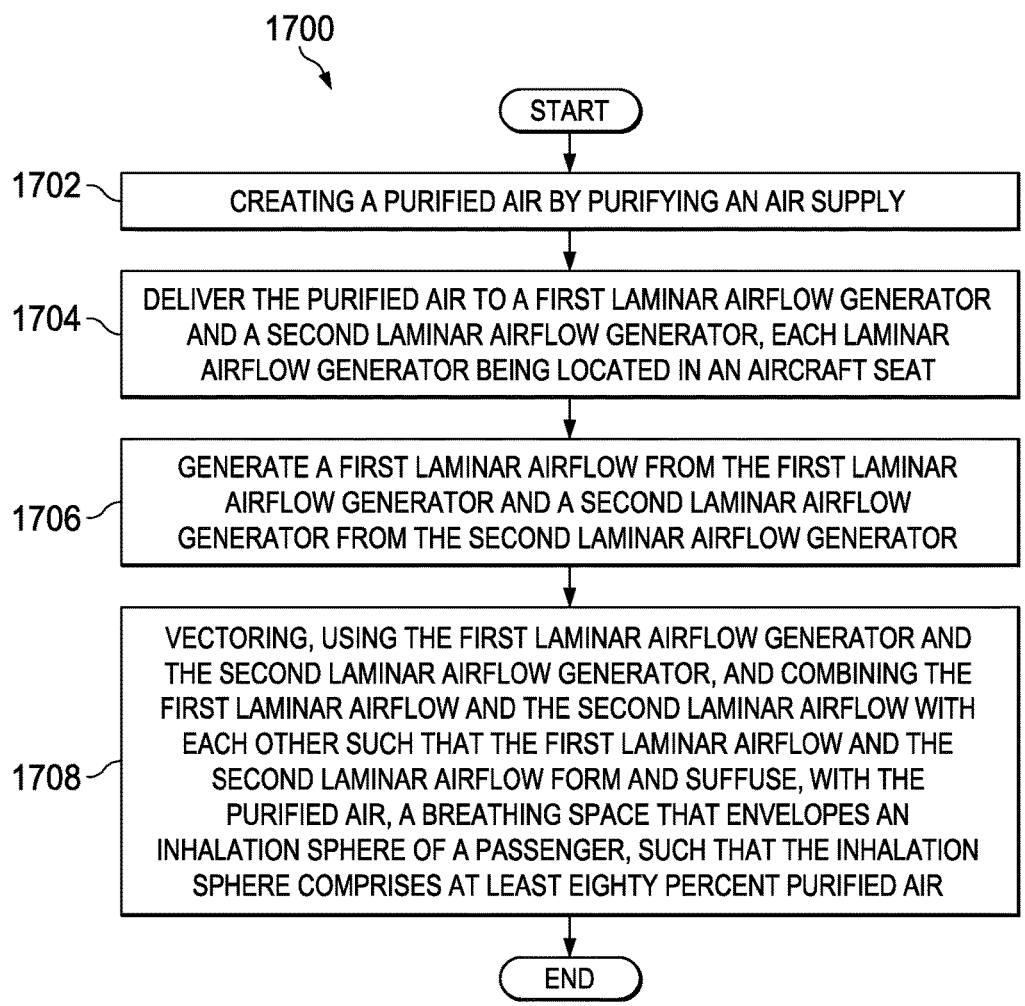
FIG. 17 depicts a flowchart of a method of providing purified air to an occupant of a seat.

With reference now to FIG. 17, FIG. 17 depicts a flowchart for a method of providing purified air to an inhalation sphere of a passenger in an aircraft seat. More specifically, method 1700 may include the operations listed below. Method 1700 may start with operation 1702 and end with operation 1706.

Method 1700 may begin by creating a purified air by purifying an air supply (operation 1702). Method 1700 may include delivering the purified air to a first laminar airflow generator and a second laminar airflow generator, each laminar airflow generator being located in the aircraft seat (operation 1704).

Method 1700 may include generating a first laminar airflow from the first laminar airflow generator and a second laminar airflow generator from the second laminar airflow generator (operation 1706). Method 1700 may also include vectoring, using the first laminar airflow generator and the second laminar airflow generator, and combining the first laminar airflow and the second laminar airflow with each other such that the first laminar airflow and the second laminar airflow may form and suffuse, with the purified air, a breathing space that may envelope an inhalation sphere of the passenger, such that the inhalation sphere may include at least eighty percent purified air (operation 1708). Operations listed for method 1700 may be performed in an order other than that presented. Some operations may be performed simultaneously. Some operations may be omitted. Operations other than those listed may be added.

Thus, the different advantageous embodiments provide a method and apparatus for conditioning air within an aircraft. In the different advantageous embodiments, air may be drawn in from a breathing zone, conditioned, and expelled into the same breathing zone or another breathing zone. In this manner, air may be processed to remove contaminants before possibly being inhaled by other passengers.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a purified air source configured to supply purified air to:
   a first laminar airflow generator that extends from a right end of a headrest of a seat and configured to generate a first barrier that comprises a first laminar airflow emitted from a first outlet approximately opposite a right ear of a passenger that occupies the seat; and
   a second laminar airflow generator that extends from a left end of the headrest and configured to generate a second barrier that comprises a second laminar airflow emitted from a second outlet approximately opposite a left ear of the passenger that occupies the seat,
   the first laminar airflow generator and the second laminar airflow generator configured such that the first laminar airflow and the second laminar airflow converge and blend in front of a nose and mouth of the passenger to form a personal breathing space that envelopes an inhalation sphere, impeding transgression of ambient air from crossing through the respective barriers and entering into the personal breathing space, such that the inhalation sphere comprises purified air supplied to the first laminar airflow generator and to the second laminar airflow generator from the purified air source such that air inhaled by the passenger comes from the inhalation sphere.

2. The apparatus of claim 1, wherein the first outlet comprises a first circular shape, and the second outlet comprises a second circular shape.

3. The apparatus of claim 2, such that a first nozzle occupies the first outlet in the first laminar airflow generator and a second nozzle occupies the second outlet in the second laminar airflow generator.

4. The apparatus of claim 1, such that each laminar airflow generator is configured to receive 8 cubic feet of air per minute and generate a laminar airflow comprising a velocity of 200 feet per minute.

5. A method of providing a purified air to an occupant of a seat, the method comprising:
   receiving the purified air;
   generating a first barrier comprising a first laminar airflow emitted from an outlet of a first laminar airflow generator located substantially opposite a first ear of the occupant and a second barrier comprising a second laminar airflow emitted from a second outlet of a second laminar airflow generator located substantially opposite a second ear of the occupant, such that the first laminar airflow generator extends outward from a first end of a headrest affixed to a seat occupied by the occupant and the second laminar airflow generator extends outward from a second end of the headrest;

converging the first laminar airflow and the second laminar airflow thus forming barriers, with the purified air, defining a personal breathing space impeding transgression of ambient air from crossing through the respective barriers and entering into the personal breathing space, and enveloping an inhalation sphere, substantially in front of a nose and mouth of the occupant, such that based upon anthropometric data, air inhaled by the occupant comes from the inhalation sphere; and suffusing the inhalation sphere with purified air.

6. The method of claim 5, wherein the breathing space occupies a height approximately 26.5 to 35.5 inches above a seat pan and a depth extending at approximately 13.5 inches forward from a back of a head of the occupant when in contact with a headrest of the seat; and wherein a width of the breathing space extends from the first laminar airflow generator to the second laminar airflow generator.

7. The method of claim 6, further comprising the first laminar airflow generator comprising an extension substantially perpendicular to the headrest of the seat.

8. The method of claim 5, such that generating comprises delivering the purified air to the first laminar airflow generator and to the second laminar airflow generator; and wherein a diameter of the inhalation sphere is substantially equal to a distance extending from a sellion to a supramenton of the occupant.

9. The method of claim 5, such that the first laminar airflow comprises a first gradient that comprises both: a first part of the first laminar airflow that contacts a face of the occupant at a first velocity that is comfortable for the occupant, and a second part of the first laminar airflow at a second velocity that is greater than the first velocity, and the second laminar airflow comprises a second gradient equivalent to the first gradient.

10. The method of claim 9, such that the first part comprises a velocity of less than 25 feet per minute with a flow rate less than 10 cubic feet per minute.

11. The method of claim 5, such that receiving the purified air comprises:

receiving an ambient air into a contaminant conditioning system located in a seatback of the seat;

purifying the ambient air in the contaminant conditioning system; and delivering the purified air to a first laminar airflow generator and a second laminar airflow generator.

12. The method of claim 5, further comprising the first laminar airflow impeding air from crossing the first barrier and entering the breathing space, and the second laminar airflow impeding air from crossing the second barrier and entering the breathing space wherein the first laminar airflow and the second laminar airflow substantially isolate and fill the breathing space with the purified air.

13. The method of claim 5, such that the breathing space forms a hood lacking corporeal features, such that the hood surrounds the inhalation sphere for the occupant; wherein the hood fills, covers, and isolates the inhalation sphere by delivering the purified air into the inhalation sphere for inhalation as though the occupant were wearing at least one of a corporeal: breathing mask, and a protective breathing equipment (PBE) mask.

14. The method of claim 5, further comprising:

the purified air being free of bacterial and viral contaminants comprising: *Bacillus subtilis*, *Mycobacterium parafortuitum*, *Pseudomonas auriginosa*, Coronavirus, Parainfluenza, Poxvirus, Picornavirus, and Paramyxovirus.

15. A method of providing purified air to an inhalation sphere of a passenger in an aircraft seat, the method comprising:

creating the purified air by purifying an air supply;

delivering the purified air to a first laminar airflow generator extending from a first end of a headrest of the aircraft seat and a second laminar airflow generator extending from a second end of the headrest;

generating a first laminar airflow from the first laminar airflow generator located substantially opposite a first ear of the passenger and a second laminar airflow from the second laminar airflow generator located substantially opposite a second ear of the passenger;

controlling vectors of airflows within the first laminar airflow and controlling vectors of airflows within the second laminar airflow and combining the first laminar airflow and the second laminar airflow with each other such that the first laminar airflow and the second laminar airflow form and fill, with the purified air, the first laminar airflow and second laminar airflow vectors impeding transgression of ambient air from crossing through the respective barriers and entering into a personal breathing space the personal breathing space envelopes the inhalation sphere of the passenger, such that the inhalation sphere comprises at least eighty percent purified air and that the air inhaled by the passenger comes from the inhalation sphere.

* * * * *

UNITED STATES PATENT AND TRADEMARK OFFICE
CERTIFICATE OF CORRECTION

PATENT NO.         : 10,029,797 B2
APPLICATION NO.    : 14/191186
DATED              : July 24, 2018
INVENTOR(S)        : Space et al.

Page 1 of 1

It is certified that error appears in the above-identified patent and that said Letters Patent is hereby corrected as shown below:

In the Claims

Column 25, Line 6, change "a seat" to --the seat--
Column 26, Line 43, change "second laminar airflow vectors" to --the second laminar airflow vectors--

Signed and Sealed this
Twenty-fifth Day of December, 2018

Andrei Iancu
*Director of the United States Patent and Trademark Office*